United States Patent
Ha-Duong et al.

(10) Patent No.: US 6,181,678 B1
(45) Date of Patent: Jan. 30, 2001

(54) BINARY-TREE DATA ELEMENT SORTING DEVICE AND ATM SPACER COMPRISING SUCH A DEVICE

(75) Inventors: Tuan Ha-Duong, Antony; Serafin Soares Moreira, Massy Cedex, both of (FR)

(73) Assignee: MET (FR)

( * ) Notice: Under 35 U.S.C. 154(b), the term of this patent shall be extended for 0 days.

(21) Appl. No.: 09/075,089

(22) Filed: May 8, 1998

(30) Foreign Application Priority Data

May 13, 1997 (FR) .................................................. 97 05828

(51) Int. Cl.[7] ............................. G08C 15/00; H04L 15/56
(52) U.S. Cl. ................................ 370/235; 370/395; 707/7
(58) Field of Search .................................... 370/232, 233, 370/235, 238, 395, 399; 375/225; 707/7; 712/300; 382/232, 283

(56) References Cited

U.S. PATENT DOCUMENTS

| | | | |
|---|---|---|---|
| 4,131,947 | 12/1978 | Armstrong | 707/7 |
| 5,168,567 | 12/1992 | Everson et al. | 712/300 |
| 5,278,825 | 1/1994 | Wallmeier et al. | 370/232 |
| 5,295,135 | 3/1994 | Kammerl | 370/235 |
| 5,297,140 | 3/1994 | Boyer et al. | 370/229 |
| 5,339,332 | 8/1994 | Kammerl | 375/225 |
| 5,400,336 | 3/1995 | Boyer et al. | 370/232 |
| 5,402,426 | 3/1995 | Foglar et al. | 370/232 |
| 5,418,777 | 5/1995 | Worster | 370/238 |
| 5,459,726 | 10/1995 | Michel et al. | 370/399 |
| 5,668,897 | * 9/1997 | Stolfo | 382/283 |
| 5,748,780 | * 5/1998 | Stolfo | 382/232 |

FOREIGN PATENT DOCUMENTS

| | | |
|---|---|---|
| 44 34 724 | 11/1995 | (DE) . |
| 0 378 195 | 7/1990 | (EP) . |
| 0 438 009 | 7/1991 | (EP) . |
| 0 498 092 | 8/1992 | (EP) . |
| 0 504 082 | 9/1992 | (EP) . |
| 0 544 034 | 6/1993 | (EP) . |
| 0 552 121 | 7/1993 | (EP) . |
| 0 680 237 | 11/1995 | (EP) . |
| 0 710 046 | 5/1996 | (EP) . |

OTHER PUBLICATIONS

G. Mercankosk et al., "Multiplexing Spacer Outputs on Cell Emissions", IEEE, Proceedings of INFOCOM'95, vol. 3, Boston, Apr. 1995, pp. 49–55.

P. Boyer et al., "A Spacer–Multiplexer for Public UNIs", Proc. of the International Switching Symposium, ISS'95, vol. 1, Berlin, Apr. 1995, pp. 457–461.

M. de Prycker et al., "Asynchronous Transfer Mode, Solution for Broadband ISDN", Ellis Horwood Ltd. 1993, $2^{nd}$ Edition, pp. 292–293.

Draft Recommendation I.371, International Telecommunications Union (ITU–T), pp. 2–30.

(List continued on next page.)

*Primary Examiner*—Hassan Kizou
*Assistant Examiner*—John Pezzlo
(74) *Attorney, Agent, or Firm*—Piper Marbury Rudnick & Wolfe

(57) ABSTRACT

In order to sort data elements each including a sort key, storage means are organized according to a binary tree of $2^n-1$ nodes which are each able to contain an element and are distributed in n successive stages numbered from 0 to n−1, stage q containing nodes $2^q$ to $2^{q+1}-1$. The elements are dispersed within the tree in such a way that each element contained in a node i has a smaller sort key than those of the elements contained in nodes $2i$ and $2i+1$. The trees managed by m successive controllers each associated with a stage or with several consecutive stages of the tree ($2 \leq m \leq n$), with n−1 interface registers between successive stages, among which those located between the controllers are pipeline registers allowing parallel working of the controllers so as to modify the contents of the tree upon exchange or insertion command propagated from stage 0 to stage n−1.

17 Claims, 19 Drawing Sheets

OTHER PUBLICATIONS

K. Batcher et al., "Sorting Networks and their Applications", AFIPS Conference Proceedings, vol. 32, Atlantic City, New Jersey, Apr.–May 1968, pp. 307–314.

Knuth, "The Art of Computer Programming", vol. 3, Sorting and Searching, Addison Wesley, 1973, pp. 142–157.

J.W. Roberts et al., "A Real Time Sorter with Application to ATM Trafic Control", Proc. of the XV International Switching Symposium, ISS'95, Apr. 1995, vol. 1, pp. 258–262.

P. Boyer et al., "Spacing Cells Protects and Enhances Utilization of ATM Network Links", IEEE Network, Sep. 1992, pp. 38–49.

E. Wallmeier et al., "The Spacing Policer, An Algorithm for Efficient Peak Bit Rate Control in ATM Networks", Proc. of the XIV International Switching Symposium, ISS'92, Oct. 1992, vol. 2, pp. 22–26.

C. Thompson, "The VSLI Complexity of Sorting", IEEE, Transactions on Computers, No. 12, New York, Dec. 1983, pp. 1171–1184.

Y. Takana, et al., "Pipeline Searching and Sorting Modules as Components of a Data Flow Database Computer", Information Processing, 1980, pp. 427–432.

* cited by examiner

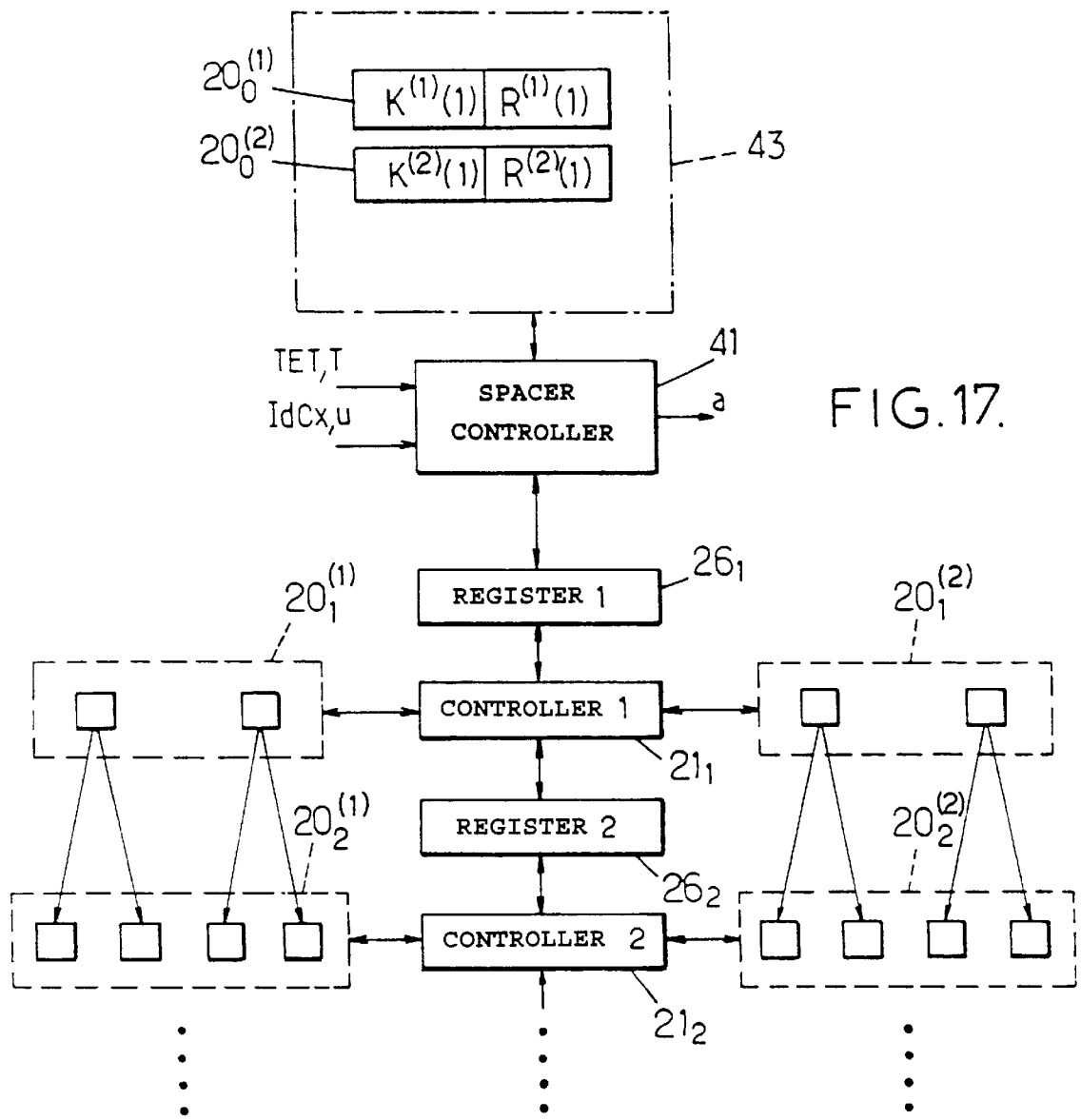

BINARY-TREE DATA ELEMENT SORTING DEVICE AND ATM SPACER COMPRISING SUCH A DEVICE

BACKGROUND OF THE INVENTION

The present invention relates to a device for sorting data elements each including a respective sort key, comprising:

storage means organized according to a binary tree with $2^n-1$ nodes numbered from 1 to $2^n-1$ which are each able to contain a data element and are distributed in n successive stages numbered from 0 to n−1, whereby stage q comprises nodes $2^q$ to $2^{q+1}-1$; and means of control of the binary tree for dispersing the elements to be sorted within the tree in such a way as to satisfy an ordering condition according to which, for each integer i lying between 1 and $2^{n-1}-1$ such that node i contains an element to be sorted, each of the nodes $2i$ and $2i+1$ either contains no element to be sorted, or contains an element whose sort key is greater than or equal to, in the sense of a determined order relation, the sort key of the element contained in node i.

The ordering of the elements in the sort tree corresponds to what is referred to as a "heapsort" in the field of computerized sorting. In this regard, reference may be made to the work by Knuth: "The art of computer programming, Vol. 3, Sorting and searching", Addison Wesley, 1973, pages 142–157.

By way of illustration, FIG. 1 shows, in the case where n=4, a sort tree comprising fifteen nodes 1–15 containing data elements (of which only the sort key is represented) which satisfy the ordering condition.

Node 1 of stage 0 is referred to as the root or vertex of the tree. The $2^{n-1}$ nodes $2^{n-1}$ to $2^n-1$ of stage n−1 are referred to as leaves of the tree. For each node i of a stage q, the $2^{n-q}-1$ nodes of the tree whose numbers are of the form $i2^j+j'$, where j and j' are integers such that $0 \leq j < n-q$ and $0 \leq j' < 2^j$, are referred to as descendants of node i (here, node i is considered to be included in its descendants). Among these descendants, the sister nodes $2i$ and $2i+1$ of stage q+1 (if q<n−1) are referred to as children of node i. The parent of node i (if q>0) is on the other hand defined as that node of stage q−1 whose number is i/2 if i is even and (i−1)/2 if i is odd. These logic relations of parentage between the nodes of the tree are represented by arrows in FIG. 1.

The order relation between the sort keys is arbitrary. In the case illustrated in FIG. 1, it is the familiar order relation between the natural integers, allowing the sorting in ascending order of the sort keys. In the case of sorting in descending order, it is clearly sufficient to invert the order relation between the keys. In FIG. 1, the nodes of the tree which are not occupied by elements to be sorted are regarded as each containing an element whose sort key is infinite, that is to say greater than any sort key of a data element to be sorted. One possibility for coding an infinite key is to reserve one bit of the data field containing the key for this purpose; the key will for example be regarded as infinite if this bit is at 1 and as finite otherwise. In other words, this bit indicates whether the node is free or occupied by a data element.

Once it is loaded with a set of $N<2^n$ ordered data elements, the sorting device is capable of delivering these N elements sequentially in N cycles in the order of the sort keys. The extracting of an element from the tree in the course of a cycle consists in reading the element located at the root of the tree and in tracing back elements of its descent in such a way as to always satisfy the ordering condition.

Thus, in the case represented in FIG. 1, the first cycle consists in reading the element 16 located at the root, and in moving element 24 to the root, then element 38 to node 2 and finally element 623 to node 4. This amounts to propagating the extraction command from the root towards the leaves.

In some applications, it is necessary for the control means also to be capable of responding to commands for inserting a new element to be sorted into the tree. The sorting device is then capable of delivering or of receiving elements to be sorted at each cycle. It operates as a dynamic queue on the basis of the sort keys, managed according to the order relation used, and possibly representing time tags or any other type of priority index.

In known binary sort trees, the insertion command is not propagated from the root to the leaves of the tree since, at the level of the given node it is not known a priori to which of the two children the command is to be propagated, it being appreciated that the decendance of one of the two children may be completely filled and hence be inappropriate for receiving the command. The insertion command is therefore propagated from the leaves of the tree to the root. For example, to insert an element whose sort key is 28 into the tree of FIG. 1, it is written to a free leaf of the tree, for example leaf 9, and comparisons are made gradually with the elements contained in the higher nodes; thus, elements 28 and 38 will be interchanged in order to re-establish the ordering in the example considered.

Under these conditions, the preceding cycle has to be completed at the time that the element having the smallest key is extracted from the tree. Accordingly, the speed at which the device can deliver or receive data elements is limited by the duration of the cycle for processing a command, this being proportional to the number of stages n, i.e. to the logarithm of the maximum number N of elements to be sorted. In applications where this number N is large, for example a few thousand, and where high speed is required, for example greater than 500,000 elements per second, the sorting device can no longer be constructed with known electronic circuits.

In their article "A real time sorter with application to ATM traffic control" (Proc. ISS'95, April 1995, Volume 1, pages 258–262), J. W. Roberts et al. have described a sorting device which does not suffer from the above speed limitation, that is to say which is capable of delivering and receiving the elements at a rate which is a priori independent of the maximum number of elements to be sorted. However, a drawback of the latter device is that the number of logic circuits operating in parallel is proportional to N. Once the number N of elements to be sorted becomes large (a few thousand or tens of thousands as in the case of the application to an ATM cell spacer envisaged in the article), the hardware complexity of the device becomes prohibitive.

An object of the present invention is to propose a fast sorting device of limited complexity.

SUMMARY OF THE INVENTION

The invention thus proposes a device of the type indicated in the introduction, wherein the control means respond to commands for modifying the contents of the binary tree which include commands for inserting a new element to be sorted. According to the invention, the means of control comprise m successive controllers each associated with a stage or with a plurality of consecutive stages of the binary tree, m being an integer lying between 2 and n, and n−1 interface registers between successive stages, among which each of the m−1 interface registers between stage pairs associated with different controllers constitutes a pipeline register, and wherein each command for modifying the contents of the binary tree is propagated from stage 0 to stage n−1 by means of the interface registers, the pipeline register or registers allowing parallel working of the controllers.

The complexity of the device is limited by the number m of controllers which is itself at most equal to the number n of stages of the tree, i.e. to the logarithm of the maximum number of elements to be sorted. The pipeline organization of the controllers allows parallel working and a high input and output rate of elements to be sorted. This rate is independent of the number of elements to be sorted. It is a maximum when the number m of controllers is equal to the number n of stages.

The sorting device according to the invention can have various applications, when fast sorting of a possibly large number of data elements is required. It may thus be constructed in the form of a coprocessor sorting card for any computerized system. An interesting field of application is that of process ordering: the sort keys then represent instants at which it is required to activate processes. The most "urgent" element can then be extracted from the tree at each instant.

The device according to the invention has a particularly advantageous application in the field of the spacing of ATM cells. A second aspect of the invention thus proposes a spacer of ATM cells transmitted according to a plurality of virtual connections, comprising a cell memory to which incoming cells are written and from which outgoing cells are read, and means for allocating a theoretical emission time to each cell stored in the cell memory. According to the invention, the spacer further comprises spacing control means for managing the cell memory, with the aid of an associated pointer memory, in such a way that the cell memory comprises, for each virtual connection for which it contains cells, a list of locations where these cells are stored in first-in first-out mode between a start of list and an end of list, and sorting means for ordering data elements each comprising a virtual connection identity and a sort key consisting of the theoretical time of emission of the cell contained in the start of list relating to said virtual connection, and for selecting at least one data element having a minimum sort key, the spacing control means being devised so as to command the emission of a cell contained in the start of list relating to a virtual connection identified in a data element selected by the sorting means, and the sorting means comprising at least one sorting device as defined above, node 1 of stage 0 of which contains said selected element.

BRIEF DESCRIPTION OF THE DRAWINGS

FIGS. 16 and 17 are partial diagrams of variant ATM spacers implementing the present invention.

DESCRIPTION OF PREFERRED EMBODIMENTS

Figure 1:
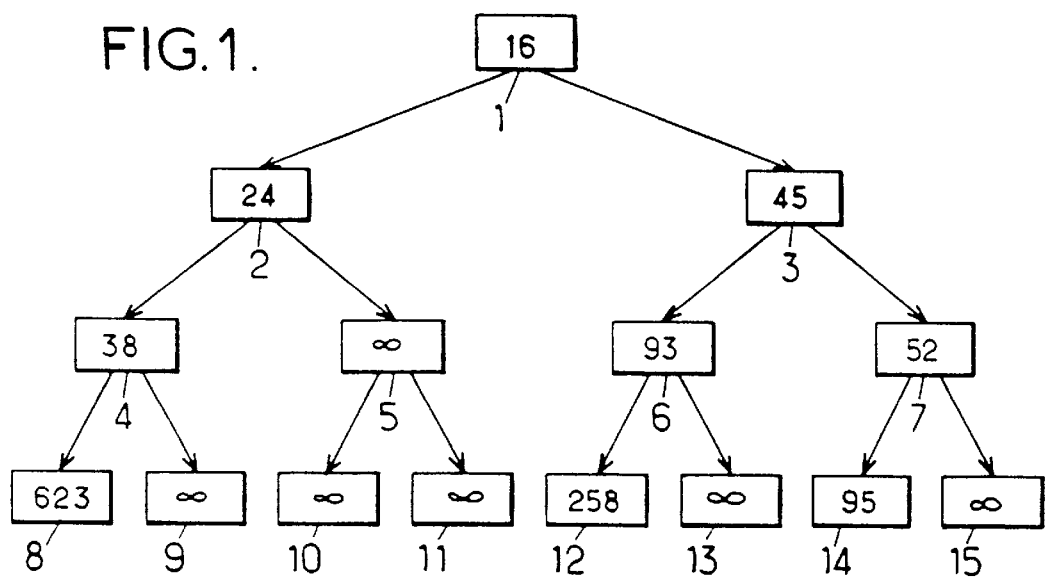
FIG. 1 is a diagram of a binary sort tree.
Figure 2:
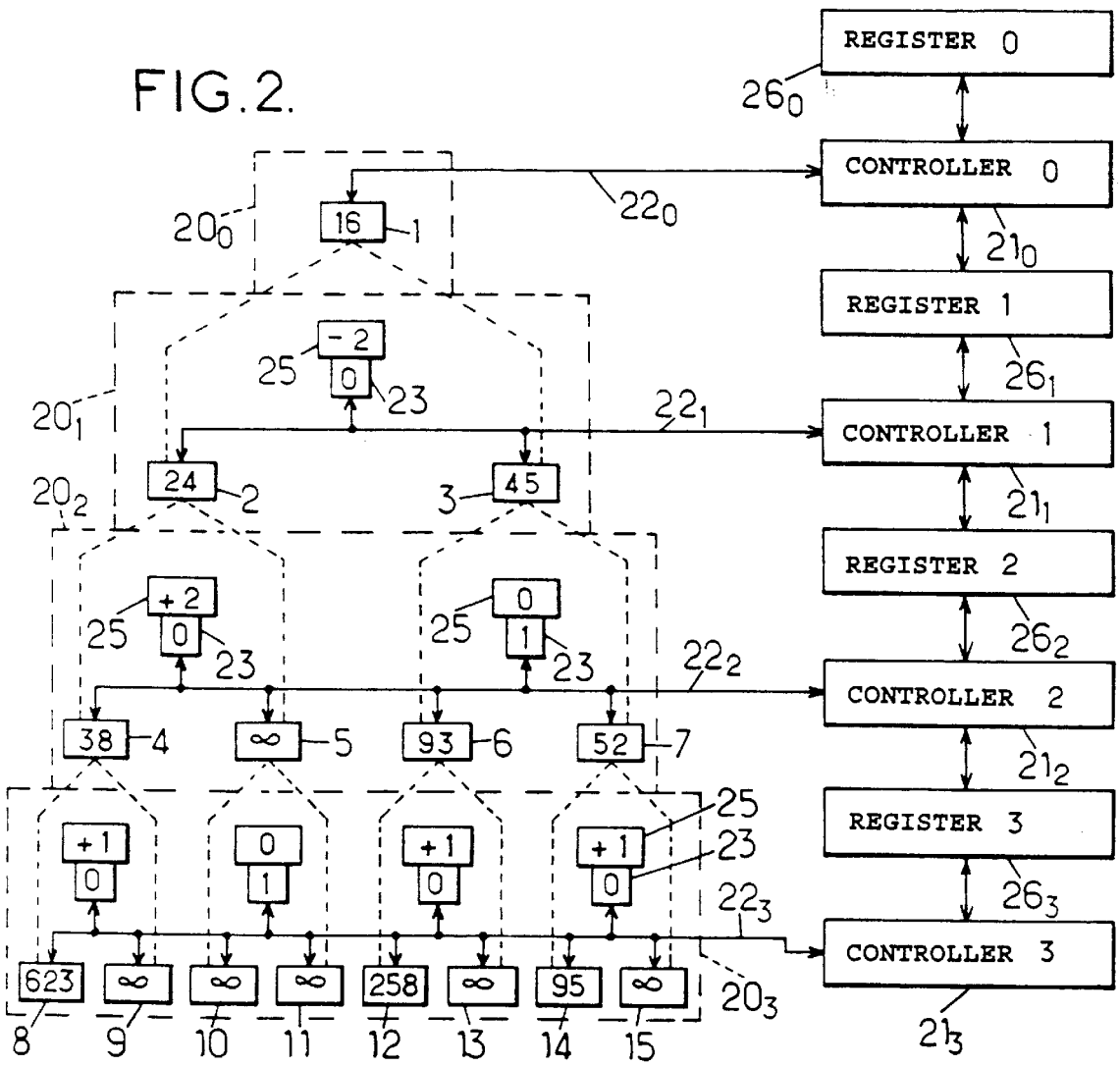
FIG. 2 is a schematic diagram of a sorting device usable according to the invention.

FIG. 2 shows a sorting device in which the data elements are contained in a memory $20_0$–$20_3$ organized in accordance with the binary tree of FIG. 1, with n=4 stages.

The binary tree is controlled by a set of m distinct controllers, where m is an integer lying between 2 and the number n of stages of the tree. In the case considered in FIGS. 2 and 3, there is one controller $21_q$ for each stage q of the tree, i.e. m=n=4. Each controller $21_q$ comprises a bus $22_q$ allowing it to access stage q. The storage means of the tree are thus divided into m=4 memory modules $20_0$–$20_3$ each accessible via a respective bus $22_0$–$22_3$. In each node i there are two memory locations for respectively containing the sort key K(i) of a data element, the only key represented in FIG. 2 (K(i)=∞ when there is no element), and a reference R(i) of this element (cf. FIG. 3).

Each stage q of the tree other than stage 0 comprises, in addition to the nodes $2^q$ to $2^{q+1}-1$, $2^{q-1}$ locations 23 with a capacity of 1 bit, and $2^{q-1}$ locations 25 with a capacity of n−q+1 bits. Each location 23 contains a steering bit F(i) associated with a pair of sister nodes 2i and 2i+1 of stage q, the value of which is F(i)=0 if the key contained in the left-hand sister 2i is less than that contained in the right-hand sister 2i+1 (K(2i)<K(2i+1)), and F(i)=1 if K(2i+1)≤K(2i). The total number of locations 23 in the sort tree is $2^{n-1}-1$.

Each location 25 of stage q contains a differential counter Δ(i) associated with a pair of sister nodes 2i and 2i+1 of stage q, the value of which is given by the difference between the number of data elements contained in the descendants of the left-hand sister 2i and the number of data elements contained in the descendants of the right-hand sister 2i+1.

The steering bits F(i) serve to propagate the extraction or exchange commands from the root to the leaves of the tree, while the differential counters Δ(i) serve to propagate the insertion commands from the root to the leaves of the tree.

The means of control of the binary tree moreover comprise n−1=3 interface registers $26_1$–$26_3$, each register $26_q$ serving as interface between the controller $21_{q-1}$ of stage q−1 and the controller $21_q$ of stage q. Represented moreover in the basic diagram of FIG. 2 is a register $26_0$ serving as interface between the controller $21_0$ of stage 0 and the environment of the sorting device. The commands sent to the sorting device are written to this register $26_0$, as are the responses supplied by the sorting device. In practice, this register $26_0$ can belong to the same circuit as the controller $21_0$ of the upper stage of the tree.

Figure 3:
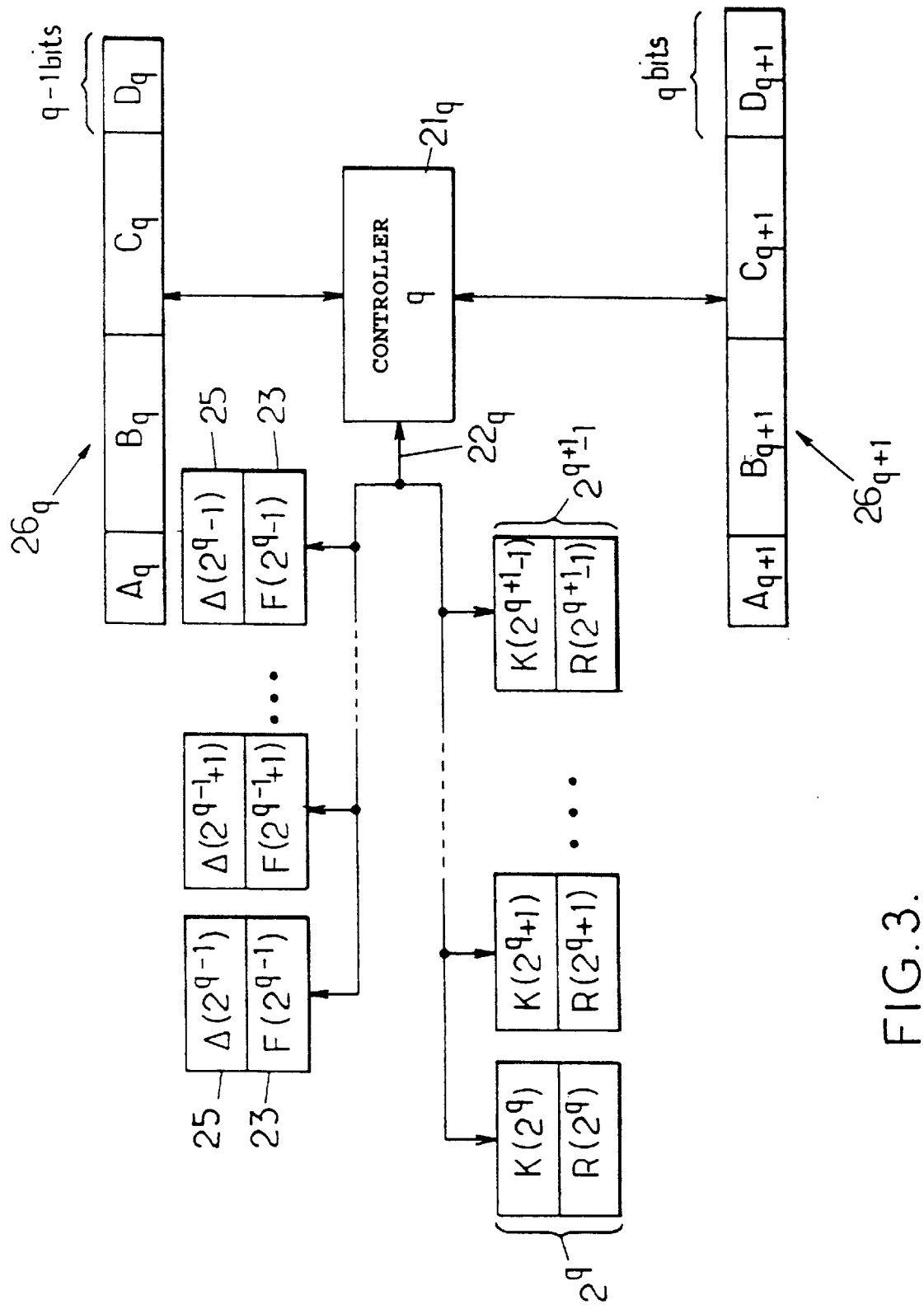
FIG. 3 is a schematic diagram showing the environment of each controller of the device of FIG. 2.

With reference to FIG. 3, each register $26_q$ is made up of four locations respectively containing:

- a command code $A_q$ designating the nature of the command propagated from the root to the leaves of the tree; in the following account, the commands $A_q$ will be regarded by way of example as coded on two bits as follows: $A_q=00$ for no modification of the contents of the tree onwards of stage q, $A_q=01$ for a command to insert a new element, $A_q=11$ for an exchange command consisting in extracting from the tree the element having the smallest sort key at the same time as a new element is inserted therein (the straightforward extraction of the element having the smallest sort key is treated as the exchanging of this element with an element having an infinite sort key), and $A_q=10$ for a command to reinitialize the contents of the tree onwards of stage q;
- a sort key $B_q$ transmitted from stage q−1 to stage q upon an insertion or exchange command, or from stage q to stage q−1 upon an exchange command;
- a reference $C_q$ associated with the sort key $B_q$ and forming with the latter an inserted or exchanged data element;
- an identification $D_q$ composed of q−1 bits (this identification does not exist in the register $26_0$), designating the node of stage q−1 from which the command $A_q$ originates. More precisely, the identification $D_q$ consists of the q−1 lowest order bits of the binary representation of the number of node i of stage q−1 from which the command $A_q$ originates, that is to say $i=1D_q$ to the base 2.

To insert a new element into the tree, the command $A_0=01$ and this new element $B_0$, $C_0$ are written to the register $26_0$, and the command is then propagated from the root to the leaves of the tree. To make an exchange, the command $A_0=11$ and the element $B_0$, $C_0$ to be inserted into the register $26_0$ (with $B_0=\infty$ in the case of a straightforward extraction) are written, and then the element having the smallest key is then fetched into the locations $B_0$ and $C_0$ of the register $26_0$.

Figure 4A:
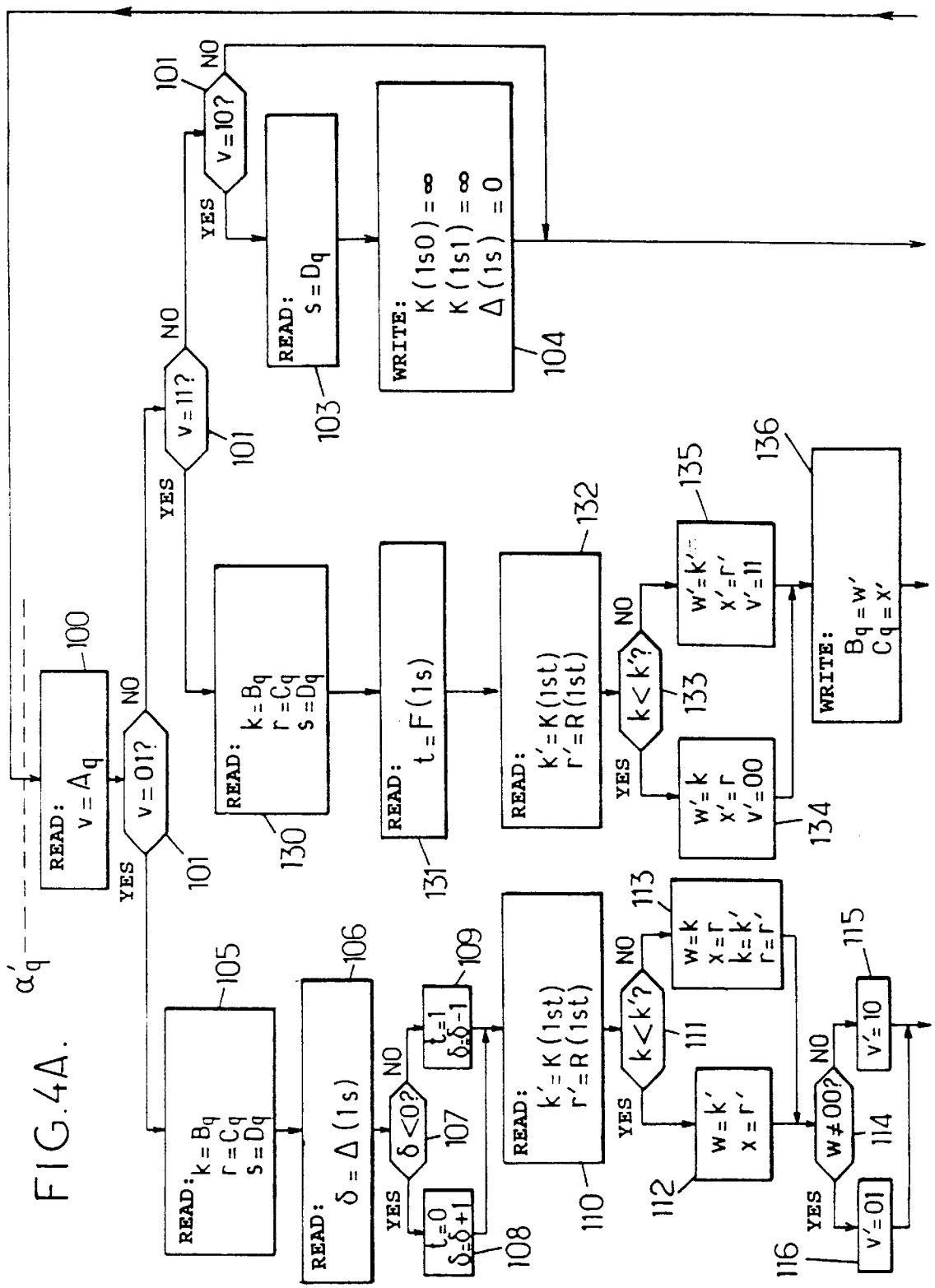
FIGS. 4A to 4C show a flowchart of the operation of the controller of FIG. 3.
Figure 4B:
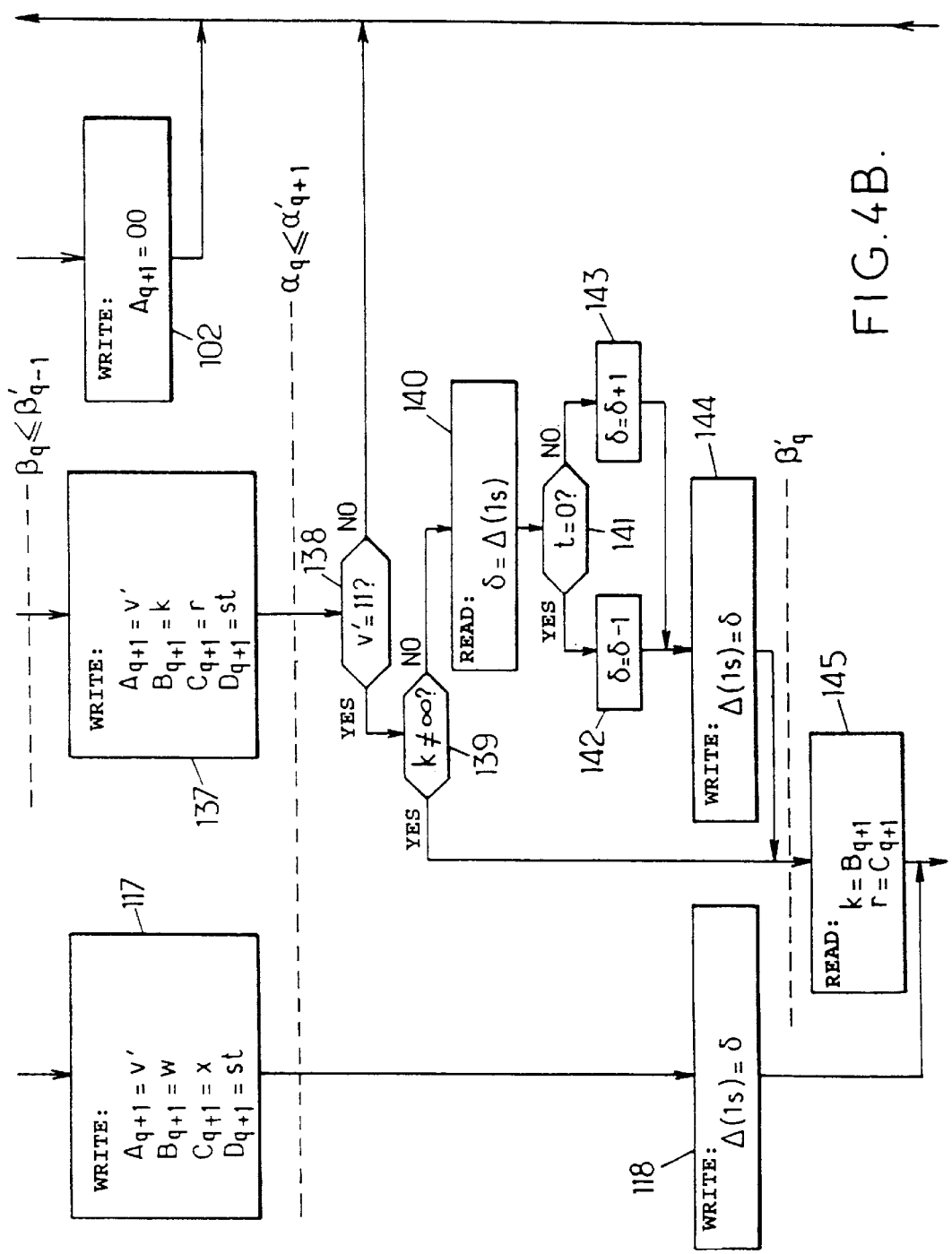
Figure 4C:
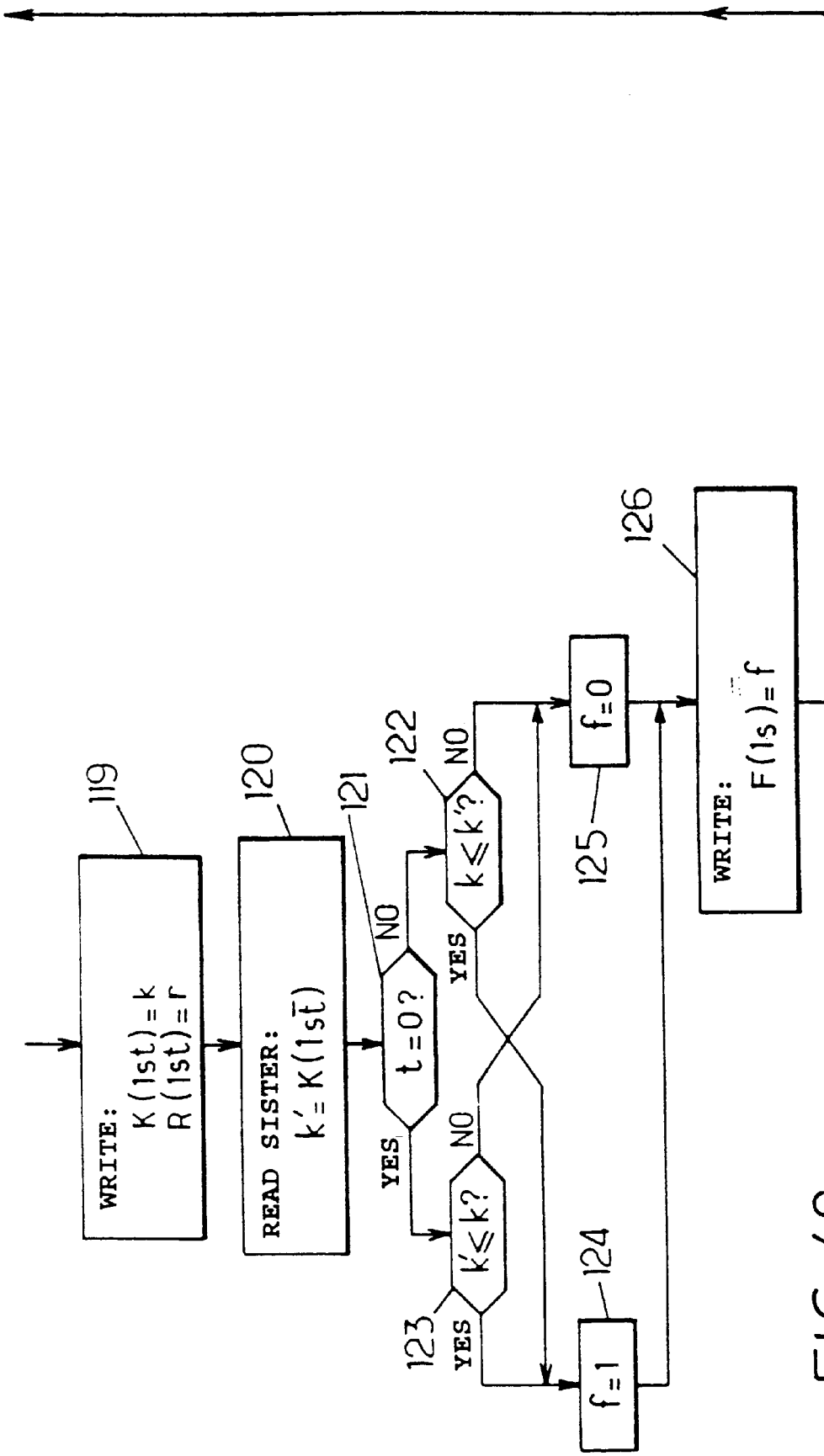

The operations performed by each controller $21_q$ are represented in the flowchart of FIGS. 4A, 4B and 4C. To execute these operations, each controller $21_q$ is made in the form of a suitably programmed network of fast logic gates. Since the operations are essentially reads/writes, incrementations/decrementations and comparisons of binary-coded variables, this programming of the network of gates poses no problem.

The command $A_q$ is firstly read from the register $26_q$ (step 100) and then evaluated (steps 101) so as to identify the type of command.

In the case of no modification ($A_q=00$), the controller $21_q$ simply writes the same command $A_{q+1}=00$ to the next register $26_q+1$ (step 102).

In the case of a reset command ($A_q=10$), the identification $D_q$ of the parent is assigned to the variable s (step 103), and the controller $21_q$ initializes the two child nodes, the binary representations of whose numbers are 1s0 and 1s1, while setting their sort key to infinity and placing the value 0 in the associated differential counter $\Delta(1s)$ (step 104), before propagating the command $A_{q+1}=00$ at step 102. In the particular case of stage 0, reset consists merely of writing $K(1)=\infty$.

When the command $A_q$ read from the register 100 refers to the insertion of a new element $B_q$, $C_q$ from a parent node $1D_q$ ($A_q=01$), these parameters $B_q$, $C_q$ and $D_q$ are read respectively by the controller $21_q$ and assigned to variables k, r and s in step 105, and then the differential counter $\Delta(1s)$ associated with the children of the identified node is assigned to the variable $\delta$ in step 106.

If $\delta<0$ (comparison 107), the right-hand child has a larger number of descendants than the left-hand child, and among the descendants of the left-hand child there is certain to be at least one node capable of receiving the new element, so that the insertion command will be propagated to the left-hand child. The bit t is then taken equal to 0, and the variable $\delta$ incremented by one unit in step 108. Conversely, if $\delta \geq 0$, the bit t is taken equal to 1 and the variable $\delta$ decremented by one unit in step 109 so as to propagate the insertion command to the right-hand child. In step 110, the sort key K(1st) and the reference R(1st) of the data element contained in the processed node, that is to say that to which the command is propagated, are read and assigned respectively to the variables k' and r'.

If k<k' (comparison 111), the processed node contains a larger sort key than the data element to be inserted, so that the element w, x which will be propagated to stage q+1 is taken, in step 112, equal to that k', r' read from the processed node. If $k' \leq k$, the element to be transmitted w, x is taken, in step 113, equal to that k, r read from the register $26_q$ in step 113, then the variables k, r respectively receive the values of the variables k', r'.

If the key w of the data element to be propagated is infinite (comparison 114), this is because the insertion command need no longer be propagated. The processor $21_q$ then gives the value 10 (reset) to the variable v' in step 115. If the key w to be transmitted is finite, the variable v' receives the value 01 in step 116 so as to indicate an insertion command. The processor $21_q$ can subsequently fill the register $26_{q+1}$ by writing $A_{q+1}=v'$, $B_{q+1}=w$, $C_{q+1}=x$ and $D_{q+1}=st$ thereto in step 117.

After step 117, the processing of the insertion command no longer requires the controller $21_q$ to access its interface registers $26_q$, $26_{q+1}$, but merely the memory area $20_q$ which it is processing. In step 118, it updates the differential counter $\Delta(1s)$ by writing thereto the new value of the variable $\delta$. Next, in step 119, it updates the data element of the processed node by writing thereto K(1st)=k and R(1st)=r.

To complete the processing of the insertion command, it then only remains for the controller $21_q$ to update the value of the steering bit F(1s) associated with the processed node 1st. The controller $21_q$ first reads the sort key K(1st) of the data element contained in the sister node of the processed node, and assigns it to the variable k'. The variable f, which will be written to the location 23 containing the steering bit F(1s) in step 126, is taken equal to 1 in step 124 (steering towards the right-hand child) if the comparisons 121, 122, 123 show that t=0 and $k' \leq k$, or that t=1 and $k \leq k'$. In the contrary case, we take f=0 in step 125.

After step 126, the processor $21_q$ has finished processing the command $A_q$, and can return to step 100 to process the next command originating from the register $26_q$.

When the command read from the register $26_q$ refers to the exchanging of a data element $B_q$, $C_q$ from a parent node $1D_q$ of stage q−1 ($A_q=11$), these parameters $B_q$, $C_q$ and $D_q$ are read and assigned respectively to the variables k, r and s in step 130, and then the value of the steering bit F(1s) associated with the two children of the identified node is assigned to the bit t in step 131. The data K(1st), R(1st) read from the processed node 1st are then assigned to the variables k' and r' in step 132.

If the processed node contains a sort key greater than that of the data element read from the register $26_q$ (k<k' during the comparison 133), the exchange command need no longer be propagated to the lower stages of the tree, so that the command v' which will be written to the register $26_{q+1}$ is taken equal to 00 (no modification) in step 134. In this step 134, the data element w', x', which will be returned to the register $26_q$, is moreover taken equal to that k, r which has the smallest sort key. If the comparison 133 shows that k≧k', step 134 is replaced by a step 135 in which the processor $21_q$ takes w'=k', x'=r' and v'=11 (propagation of the exchange command).

The processor $21_q$ then proceeds to step 136 where it writes the element w', x' to the locations $B_q$ and $C_q$ of the interface register $26_q$.

To propagate the command, the controller $21_q$ then executes step 137, where it writes to the interface register $26_{q+1}$: $A_{q+1}$=v', $B_{q+1}$=k, $C_{q+1}$=r and $D_{q+1}$=st.

If the propagated command is not an exchange command, that is to say if the comparison 138 shows that v'≠11, the processing of the exchange command by the controller $21_q$ is terminated after the write step 137. Otherwise, the processor $21_q$ goes to step 139 where it examines whether the key k which it has transmitted to stage q+1 is infinite or not.

If the comparison 139 shows that k=∞, then the exchange command is in fact a straightforward extraction command and it is necessary to update the differential counter Δ(1s) associated with the processed node. The value of this differential counter is firstly read and assigned to the variable δ in step 140. If the controller $21_q$ has processed a left-hand child (t=0 during the comparison 141), the variable δ is decremented by one unit in step 142, while it is incremented by one unit in step 143, in the contrary case. The differential counter Δ(1s) is then updated in step 144 according to the new value of the variable δ.

Given that the exchanging of two elements each having a finite sort key does not affect the values of the differential counters, steps 140 to 144 are not executed if the comparison 139 shows that the key transmitted k is finite.

The processor $21_q$ then resumes the processing of the exchange command in step 145 by reading the data element $B_{q+1}$, $C_{q+1}$ which the controller $21_{q+1}$ has returned (during its step 136) to the register $26_{q+1}$, and by assigning this returned element to the variables k and r. The processing of the command subsequently terminates via steps 119 to 126 such as described above.

The flowchart of FIGS. 4A–4C has been presented in the case of any stage q. Of course, a few adaptations are necessary in respect of the first stage q=0 and the last stage q=n−1. Thus, for q=0, the processed node 1st is understood to be always the root of the tree, steps 106–109, 118, 120–127, 131 and 139–144 possibly being omitted. Given that it is not necessary to provide a register $26_n$ downstream of the last controller, steps 110 to 117 can be omitted as regards the last stage n−1, as can steps 102, 137 and 145 and also, in respect of exchange only, step 119.

The temporal organization of the parallel working of the successive controllers is conditioned by the sharing of the access to the interface registers $26_q$. Indicated in FIGS. 4A and 4B is the instant $\alpha_q$ at which the controller $21_q$ has finished writing to the register $26_q$ the command which it transmits as well as the associated parameters (after step 102, 117 or 137 depending on the type of command), as well as, in the case of an exchange command, the instant $\beta_q$ at which the controller $21_q$ has finished writing to the register $26_q$ the data element $B_q$, $C_q$ which it returns to the controller $21_q$. Moreover, $\alpha'_q$ denotes the instant at which the controller $21_q$ begins reading a new command from the register $26_q$ (immediately before step 100), and $\beta'_q$ denotes the instant at which the controller $21_q$ begins reading from the register $26_{q+1}$ the data element returned by the controller $21_{q+1}$ in the case of an exchange command (immediately before step 145). To obtain correct pipeline operation, it is sufficient to devise the controllers in such a way that, for each command, we have $\alpha_q \leq \alpha'_{q+1}$ and $\beta_q \leq \beta'_{q-1}$.

To satisfy these two conditions, the controllers $21_q$ can be asynchronous or synchronous. In the first case, pipeline operation is ensured with the aid of acknowledgement signals exchanged between the controllers. After having executed its step 136, the controller $21_q$ sends an acknowledgement signal to the controller $21_{q-1}$ which then knows that it can proceed to its step 145 and to the further processing of the exchange command. Moreover, after having executed step 102 or 137 or 117, the controller $21_q$ sends an acknowledgement signal to the controller $21_{q+1}$ which then knows that it can begin processing the command by commencing its read step 100.

Synchronous operation of the controllers $21_q$ will often be more convenient to implement in the case where the controllers are constructed from networks of logic gates. In this case, the organization of the pipeline is illustrated by the timing diagrams of FIG. 5.

In this figure, each of the four lines illustrates the operation of the controller of one of the stages. The letters RD and WR above the line relating to stage q respectively represent a read and a write performed by the controller $21_q$ from/to the register $26_q$, while these same letters located below the line respectively indicate a read and a write from/to the register $26_q$. The arrows between stages thus represent transfers of command and of parameters by means of the pipeline registers. The hatched intervals represent the instants at which the controller $21_q$ is working on the memory area $20_q$ which it controls.

Figure 5:
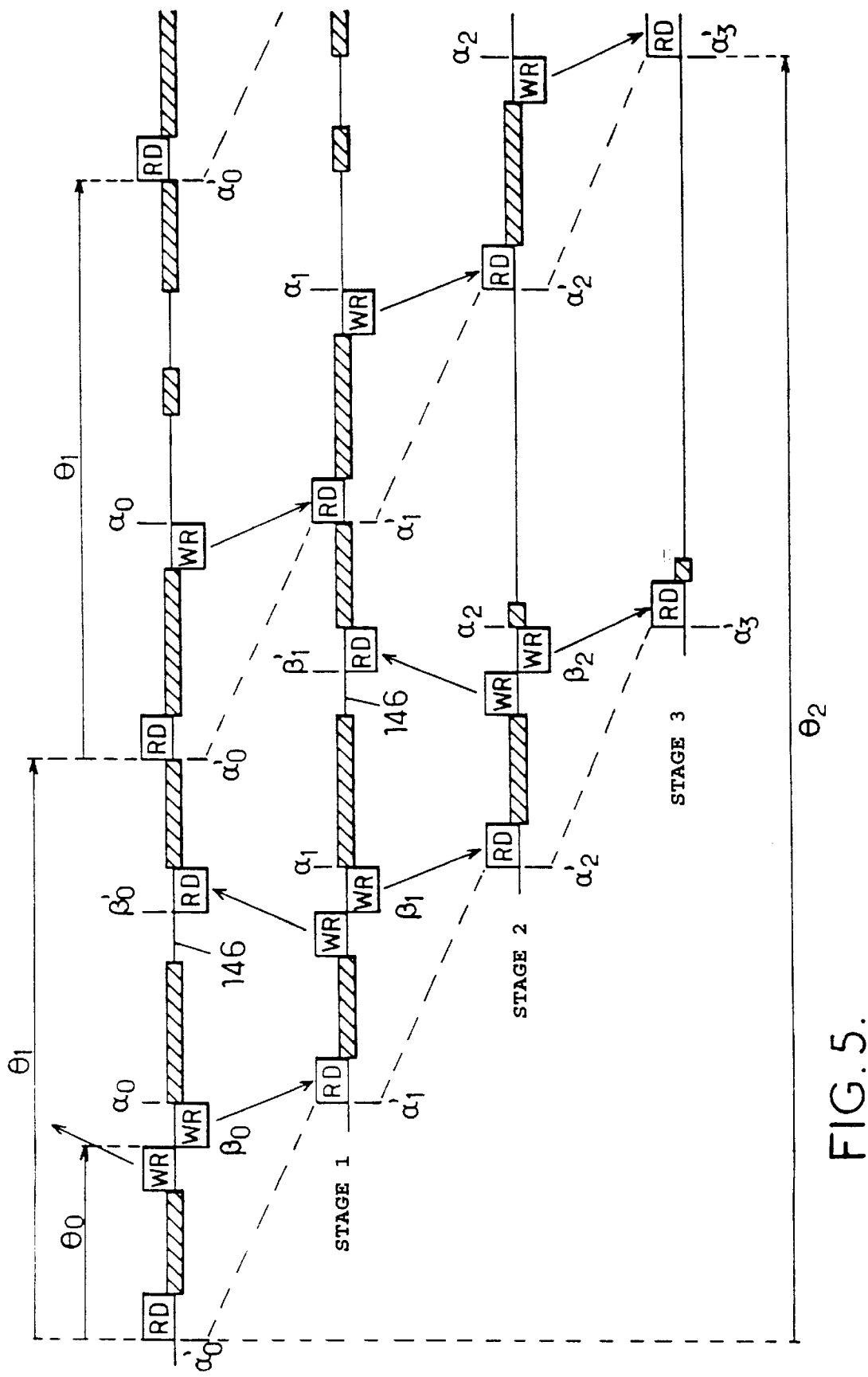
FIG. 5 shows a timing diagram of the operation of the sorting device.

The period $\theta_1$ indicated in FIG. 5 determines the rate at which the sorting device can receive new elements and deliver the elements having the smallest sort keys. It corresponds to the duration required by each controller in order to process the set of instructions relating to a command. It can be seen that this period $\theta_1$ is substantially shorter than the duration of the cycle $\theta_2$ which is necessary to re-establish the ordering rule throughout the sort tree after a new command has begun to be processed. In the example represented in FIG. 5, the first period $\theta_1$ corresponds to the exchanging of the element located at the root of the tree with another element which is to be placed in stage 1 (that is to say, in the case of FIG. 2, its key lies between 25 and 38), and the second period $\theta_1$, corresponds to the insertion of a new element up to stage 2 (the key is greater than or equal to that of the element introduced during the preceding exchange operation).

It is further noted that the response time $\theta_0 = \beta_0 - \alpha'_0$ required by the device to return the data element having the minimum sort key to the register $26_0$ corresponds to around one-third of the period $\theta_1$.

To minimize the period $\theta_1$, and hence maximize the rate of operation of the sorting device, it is beneficial to homogeneously intersperse the processing operations performed by the controllers within the intervals separating the instants at which they access their interface registers. This can be achieved by moving the processing of certain instructions of the flowchart of FIGS. 4A to 4C. If, for example, before the instants $\beta'_q$ there are timespans 146 (FIG. 5) in which the controller q must wait for the controller $21_{q+1}$ to have finished executing its series of instructions 130–136 before reading the result thereof from the register $26_{q+1}$, at least some of this timespan can be filled by executing other instructions, and this will make it possible to save time elsewhere. Thus, for example, in the case of FIGS. 4A–4C, the reading 120 of the sort key of the sister of the processed node could be performed before step 145 in an exchange operation and after step 118 in an insertion operation. This type of optimization depends largely on the choices of architecture which are made for programming the logic gate networks.

In the above description, the case was considered in which each of the controllers is associated with a single stage of the binary tree, access to which is reserved therefor, thus affording the device the best speed performance. The complexity of the device, measured as the number of logic circuits (controllers $21_q$) necessary for its operation, is then n, that is to say the logarithm of the maximum number of elements to be sorted.

This complexity can be reduced, at the cost of a corresponding decrease in the speed of the device, by associating several consecutive stages of the tree with some at least each of the controllers (i.e. m<n), instead of just a single stage. The number of stages per controller is not necessarily identical for all the controllers. In particular, if the controller associated with stage 0 at least also carries out other functions in connection with the environment of the sort tree, provision may be made for this controller to manage a smaller number of stages than the others.

In the case in which a controller is associated with several stages of the tree, the propagation of a command along these stages is processed sequentially by this controller.

Figure 6:
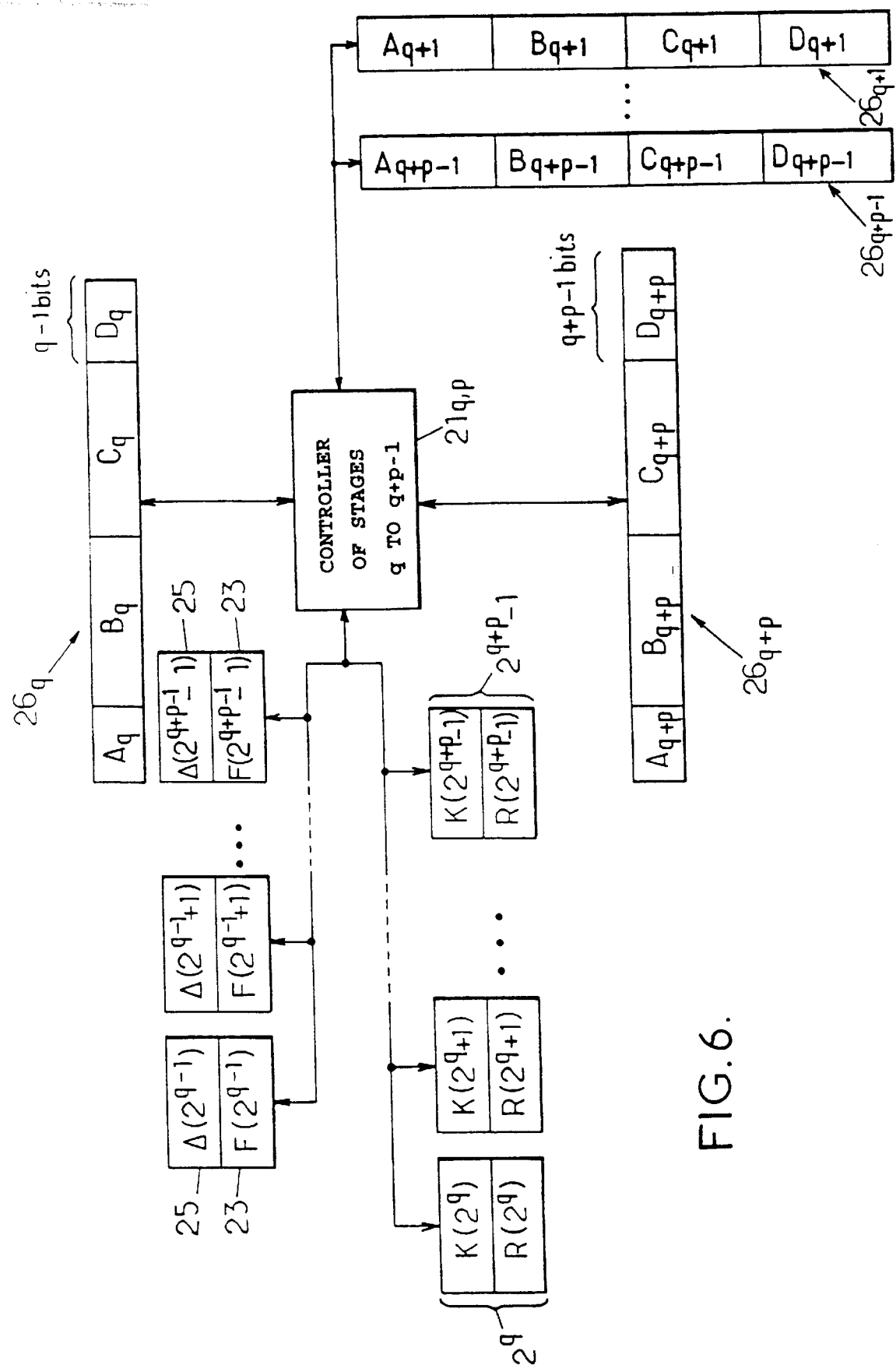
FIGS. 6 and 7 are diagrams similar to that of FIG. 3 and showing possible variants in respect of the environment of the controllers.

As FIG. 6 shows in the case of a controller $21_{q,p}$ associated with stages q to q+p−1 of the tree, only the interface registers $26_q$, $26_{q+p}$ between the stages associated with different controllers constitute pipeline registers in respect of the parallel operation of the successive controllers. The other registers $26_{q+1}$, . . . , $26_{q+p-1}$ are accessible only by the controller $21_{q,p}$. They may form part of the logic circuit constituting this controller $21_{q,p}$, or else form part of the memory module reserved for this controller and comprising stages q to q+p−1.

It will be noted that it is possible to dispense with the differential counters Δ(i) in the stages of the binary tree which are associated with the m−th controller. Let us assume that this latter controller is associated with the p stages n−p to n−1 (1≦p<n−1). When an insertion command $A_{n-p}=01$ is read from the pipeline register $26_{n-p}$ the parent from which this command originates is the node $1D_{n-p}$ identified in this register. If, for each of the $2^{n-p-1}$ possible parents, the last controller keeps up to date a respective list of free leaves forming part of the descendance of this parent node, then the last controller can process the insertion command by propagating it sequentially from stage n−1 towards stage n−p starting from a free leaf belonging to the list associated with the parent node identified in the field $D_{n-p}$ of the pipeline register. In each of these lists, each of the leaves can be simply designated by p bits which, together with the n−p−1 bits of the identification $D_{n-p}$, identify the leaf unambiguously. A simple way of keeping this list consists in organizing it in last-in first-out (LIFO) mode. The last controller can also propagate the insertion command from stage n−p towards stage n−1, given that the p bits designating a free leaf on the basis of an identified parent can be used at each stage to steer the propagation of the insertion command.

In the final analysis, the sorting device of the type illustrated by FIGS. 2 to 6 can be constructed by providing just $2^{n-p-1}-1$ differential counters Δ(i) respectively associated with the pairs of nodes 2i and 2i+1 of the tree for i ranging from 1 to $2^{n-p-1}$.

FIGS. 7 to 11 illustrate another embodiment of a sorting device.

To facilitate the account, the case will again be considered in which each controller $21_q$ is associated with a single stage q of the binary tree (m=n). However, it will be understood that, as before, the architecture of this sorting device is easily transposable to the case in which at least one of the controllers is associated with several stages (m<n).

Figure 7:
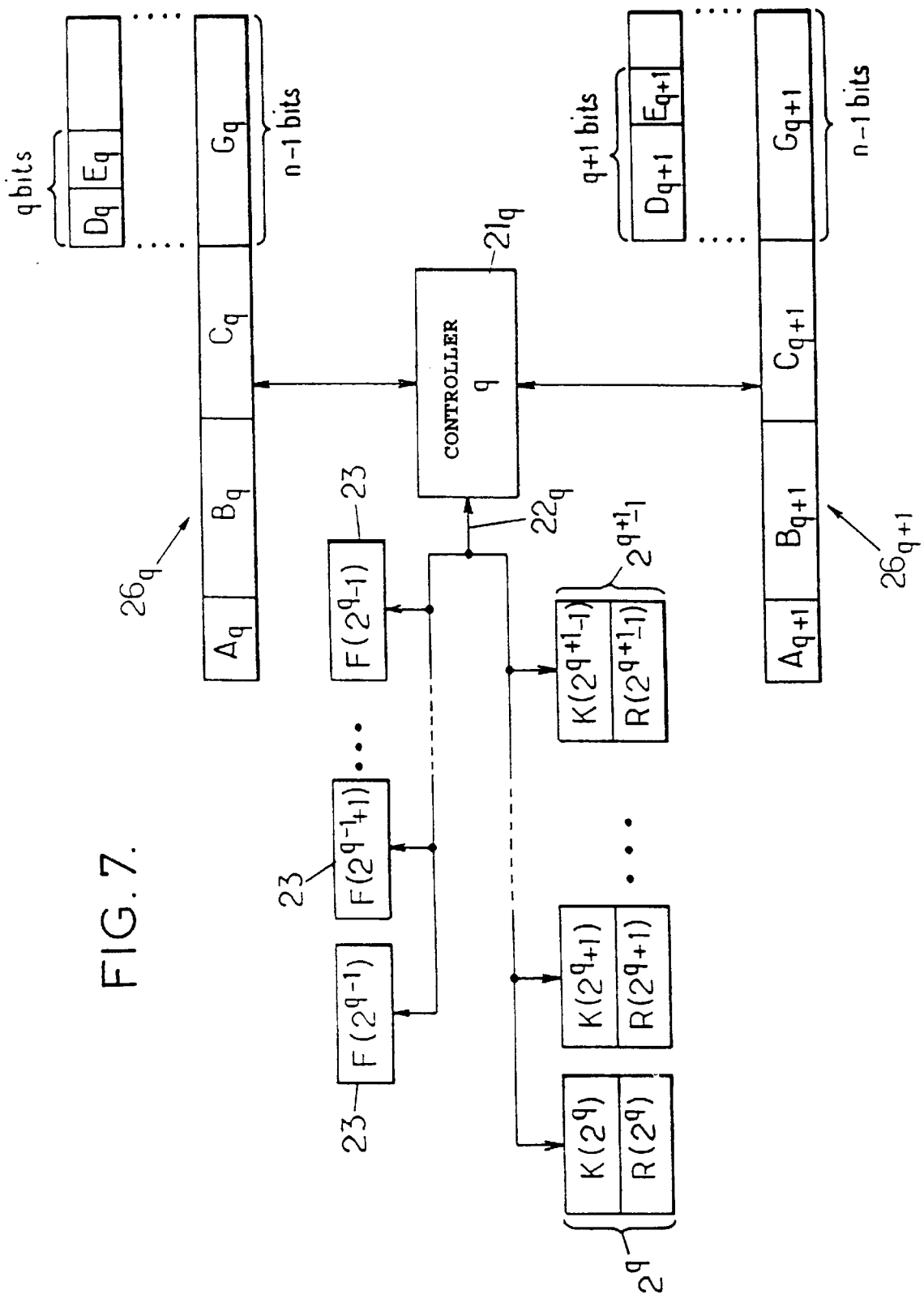

Unlike the exemplary embodiment described earlier, that of FIGS. 7 to 11 does not use differential counters to propagate the insertion commands from the root to the leaves of the tree. Each memory module $20_q$ corresponding to a stage q of the tree thus comprises nodes $2^q$ to $2^{q+1}-1$ and the locations 23 for receiving the steering bits $F(2^{q-1})$ to F $(2^{q-1})$, but no locations 25 for receiving differential counters, as FIG. 7 shows.

Each interface register $26_q$ comprises, in addition to the four locations containing the parameters $A_q$, $B_q$, $C_q$ and $D_q$ defined earlier, an additional location which receives a bit $E_q$ which designates, during the propagation of an insertion command from a node $1D_q$ of stage q−1, the child node of stage q to which this command is propagated. Thus, if $E_{q=0}$, the insertion command is propagated to the left-hand child $1D_q0$, while, if $E_q=1$, the insertion command is propagated to the right-hand child $1D_q1$.

In the register $26_q$, the identification $D_q$ of the parent node and the bit $E_q$ designating the child node consist of the q highest order bits of the contents $G_q$ of a leaf designation field of n−1 bits. The contents $G_q$ of this leaf designation field designate, during the propagation of an insertion command, one of the free leaves of the binary tree towards which this command is propagated. The binary representation of this free leaf is $1G_q$. Given that the leaf designated is free, the inserted element will definitely be able to find its place on the path from the root of the tree to this designated free leaf, on condition that no other insertion command to this same leaf is currently propagating downstream of the binary tree.

Figure 8:
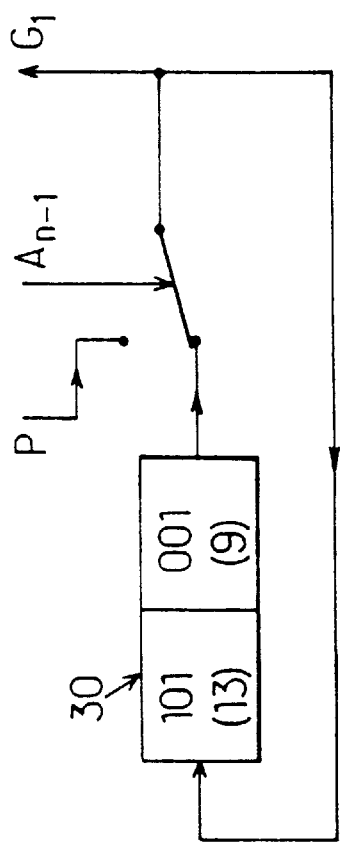
FIG. 8 is a diagram showing a shift register usable with a sorting device according to FIG. 7.

To fulfil this condition, the leaf designation field of the interface register $26_1$ between stages 0 and 1 receives its value $G_1$ from the controller $21_{n-1}$ associated with the last stage of the tree. The controller $21_{n-1}$ keeps a first list of free leaves, for example by means of a shift register 30 such as that shown diagrammatically in FIG. 8. This register contains a number n' of locations of n−1 bits, and performs a shift operation at each command period $\theta_1$. Any leaf towards which an insertion command may perhaps be propagating within the binary tree forms part of this first list of n' free leaves. So long as the command $A_{n-1}$ read by the last controller from the interface register $26_{n-1}$ is not an insertion command ($A_{n-1}\neq 01$), the shift register 30 is looped back on itself as shown by FIG. 8, so that it delivers the same leaf designation every n' periods $\theta_1$. This designation $G_1$, which is then known to be different from each of those of the leaves towards which insertion commands may perhaps be propagating within the tree, is written to the corresponding field of the interface register $26_1$. If by contrast an insertion command $A_{n-1}=01$ reaches the last stage of the tree, then a new free leaf P, extracted by the last controller from a second list of free leaves in a manner which will be explained later, is introduced into the shift register 30 and into the interface register $26_1$.

Figure 9:
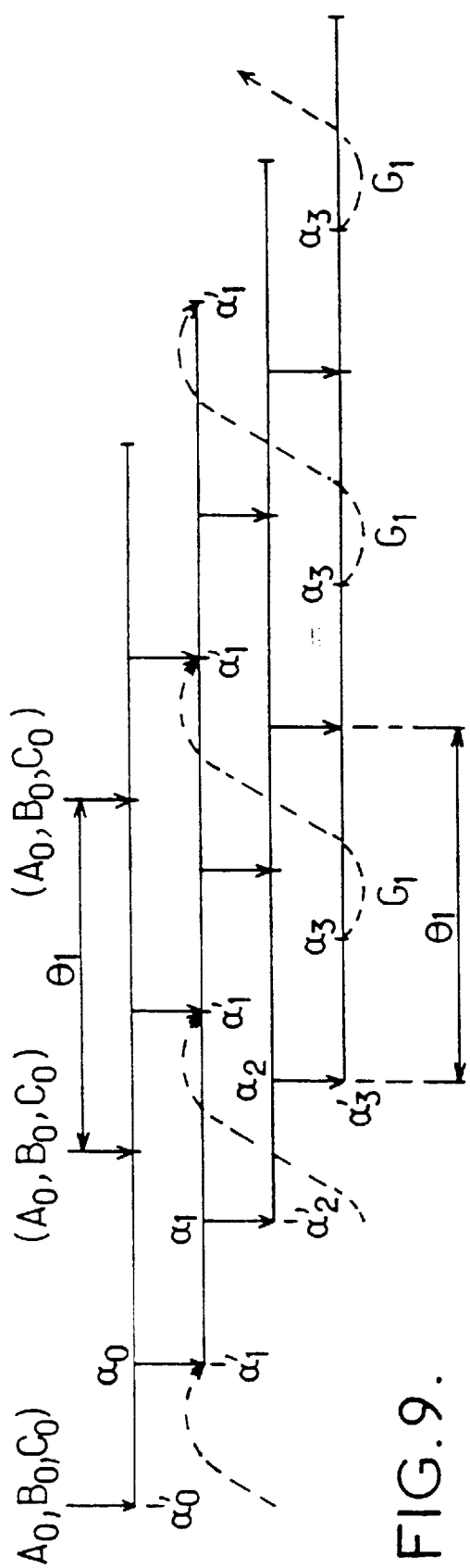
FIG. 9 shows a simplified timing diagram of the sorting device.

To explain this manner of operation, FIG. 9 enlists the timing diagrams of FIG. 5, in a simplified form, in the case in which the device processes in consecutive fashion commands for inserting new elements into the tree. In this FIG. 9, each arrow tip designates an instant $\alpha'_q$ at which a controller $21_q$ begins to process an insertion command. Thus, at the instants $\alpha'_0$, the controller $21_0$ receives the pertinent commands and parameters $A_0$, $B_0$, $C_0$ from the environment of the device, and at the instants $\alpha'_q$ with $q \geq 1$, the controller $21_q$ receives the commands and parameters $A_q$, $B_q$, $C_q$ and $G_q$ in the register $26_q$ and commences the corresponding processing operations. In the exemplary temporal organization represented in FIG. 9, each insertion command for which the last controller $21_{n-1}$ has written the corresponding designation $G_1$ of a free leaf to the register $26_1$ reaches this last controller in the register $26_{n-1}$ after two periods $\theta_1$. Consequently, in this example, it is sufficient to take n'=2 locations in the shift register 30.

In this same example (see also FIG. 1), FIG. 8 shows the n'=2 leaves 9 and 13 (designated by 001 and 101 respectively since the binary representations of the numbers 9 and 13 are 1001 and 1101) contained in the list kept in the register 30. The leaf 9 has therefore been designated in the field $G_1$ during the penultimate command. If this command refers to the insertion of a new element and culminates at leaf 9 (that is to say $A_{n-1}$=01 in the current period of operation of the last processor), the leaf 9 is deleted from the list and from the register 30 and is replaced by a new leaf (10, 11 or 15 in the case of FIG. 1) designated by P. Otherwise, said penultimate command either does not refer to an insertion, or refers to the insertion of a data element which has found its place upstream of stage n−1, so that the leaf 9 is retained in the register 30 and is again designated in the field $G_1$ for the next command.

In practice, the number n' shall always be less than the number n of stages in the binary tree. Given that this embodiment of the sorting device implies that at each instant the binary tree has at least n' free leaves, the maximum number of data elements which the device is capable of sorting is reduced, as compared with the device described earlier, by an amount which is always less than 2n', so that the sorting capacity of the device is not significantly affected when the number of stages is not too small. If, for example, the device comprises n=12 stages with n'=4, it can sort up to N=4095 elements in the case where differential counters are used, and up to N=4088 elements in the case where lists of free leaves are used, the difference between these two values of N not being significant.

Figure 10A:
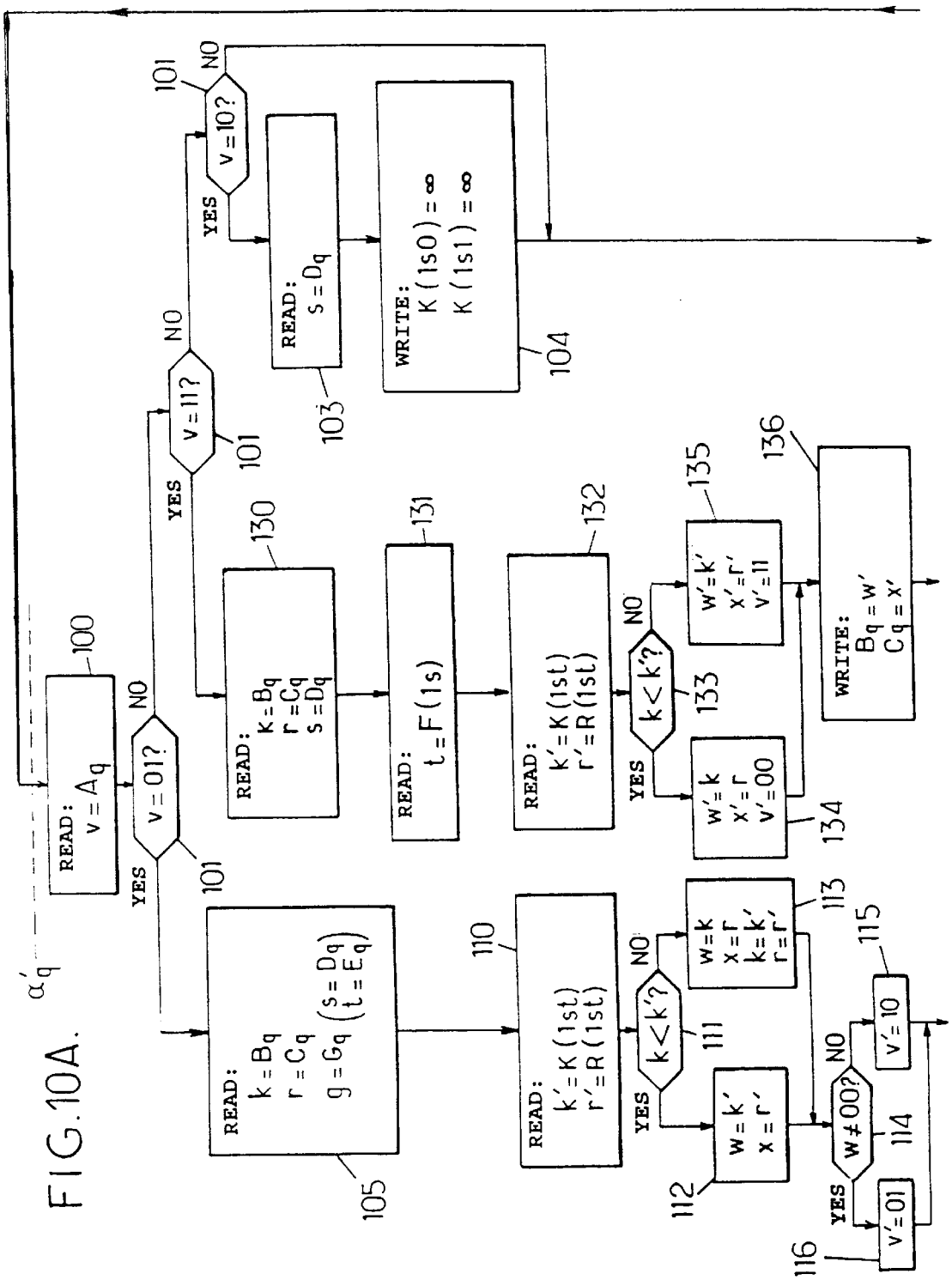
FIGS. 10A and 10B, which are to be supplemented with FIG. 4C, show a flowchart of the operation of the controller of FIG. 7.
Figure 10B:
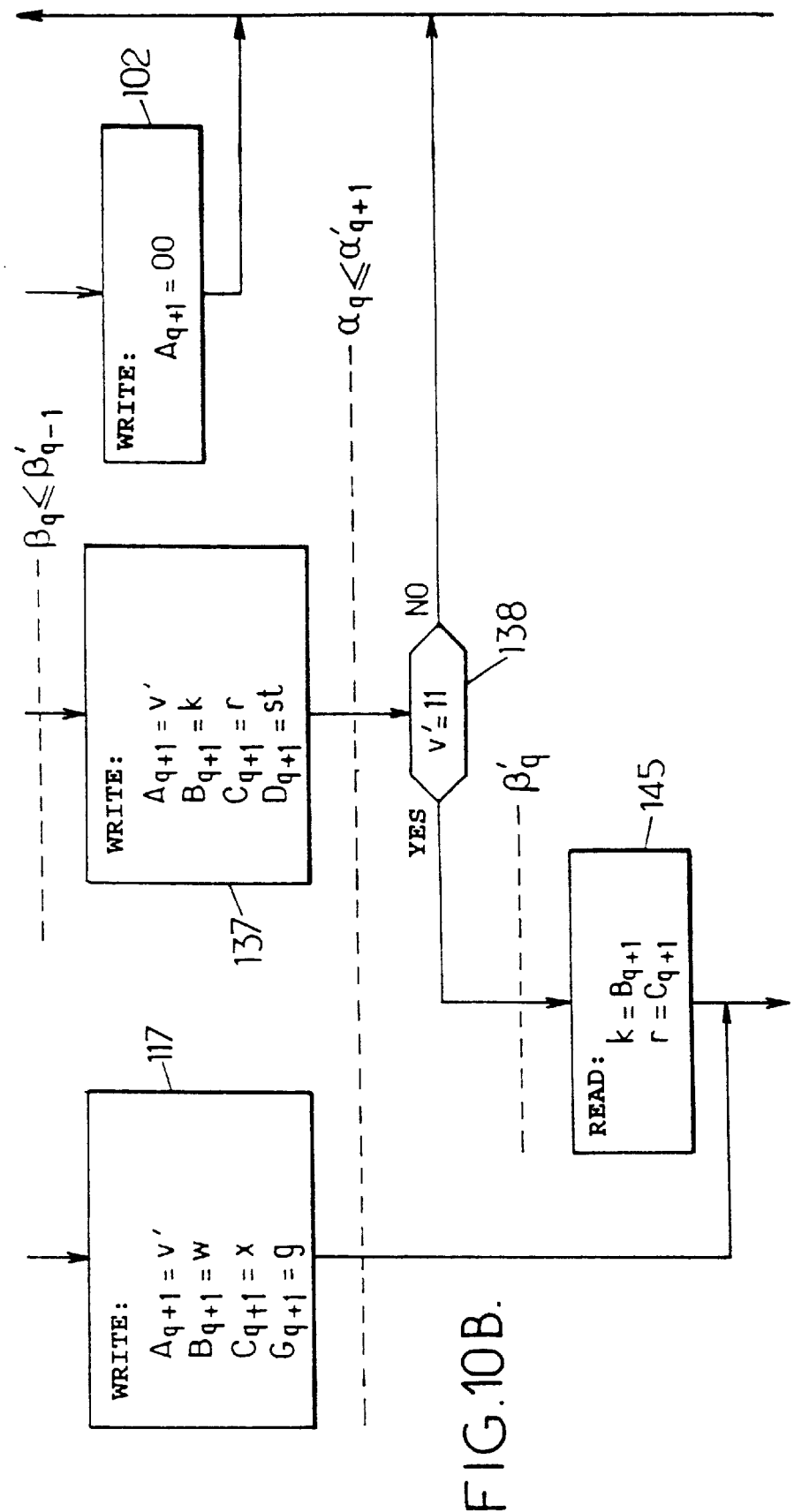

FIGS. 10A and 10B, which should be supplemented with FIG. 4C, show a flowchart similar to that of FIGS. 4A to 4C (the same numerical references have been employed to designate similar steps), and detail the operations performed by a controller $21_q$ of the type represented in FIG. 7, with q<n−1, during the processing of a command.

As compared with the flowchart of FIGS. 4A, 4B and 4C, that of FIGS. 10A, 10B and 4C has been simplified by deleting all the operations referring to the differential counters. In steps 105 and 117 executed in the processing of an insertion command, the whole of the leaf designation field $G_q$ or $G_{q+1}$ is read or written from/to the interface register $26_q$ or $26_q'$, rather than just the identification of the parent node $D_q$ or $D_{q+1}$. A simplification of the structure of the controllers and a reduction in the memory space which each of them must respectively be capable of accessing are obtained, as compared with the previous example.

Figure 11A:
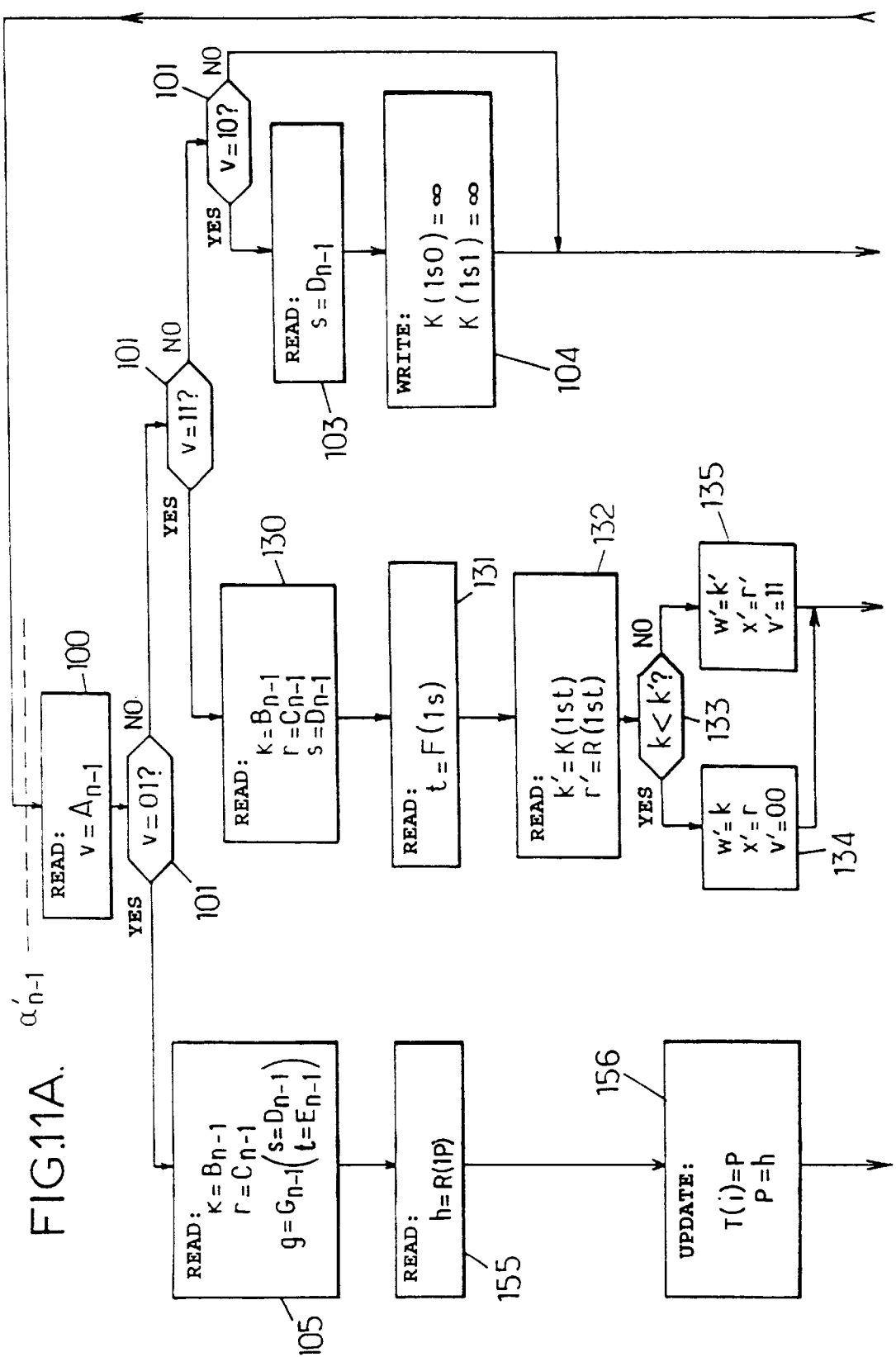
FIGS. 11A and 11B, which are to be supplemented with FIG. 4C, show a flowchart corresponding to that of FIGS. 10A, 10B and 4C in the particular case of the last stage of the binary tree.
Figure 11B:
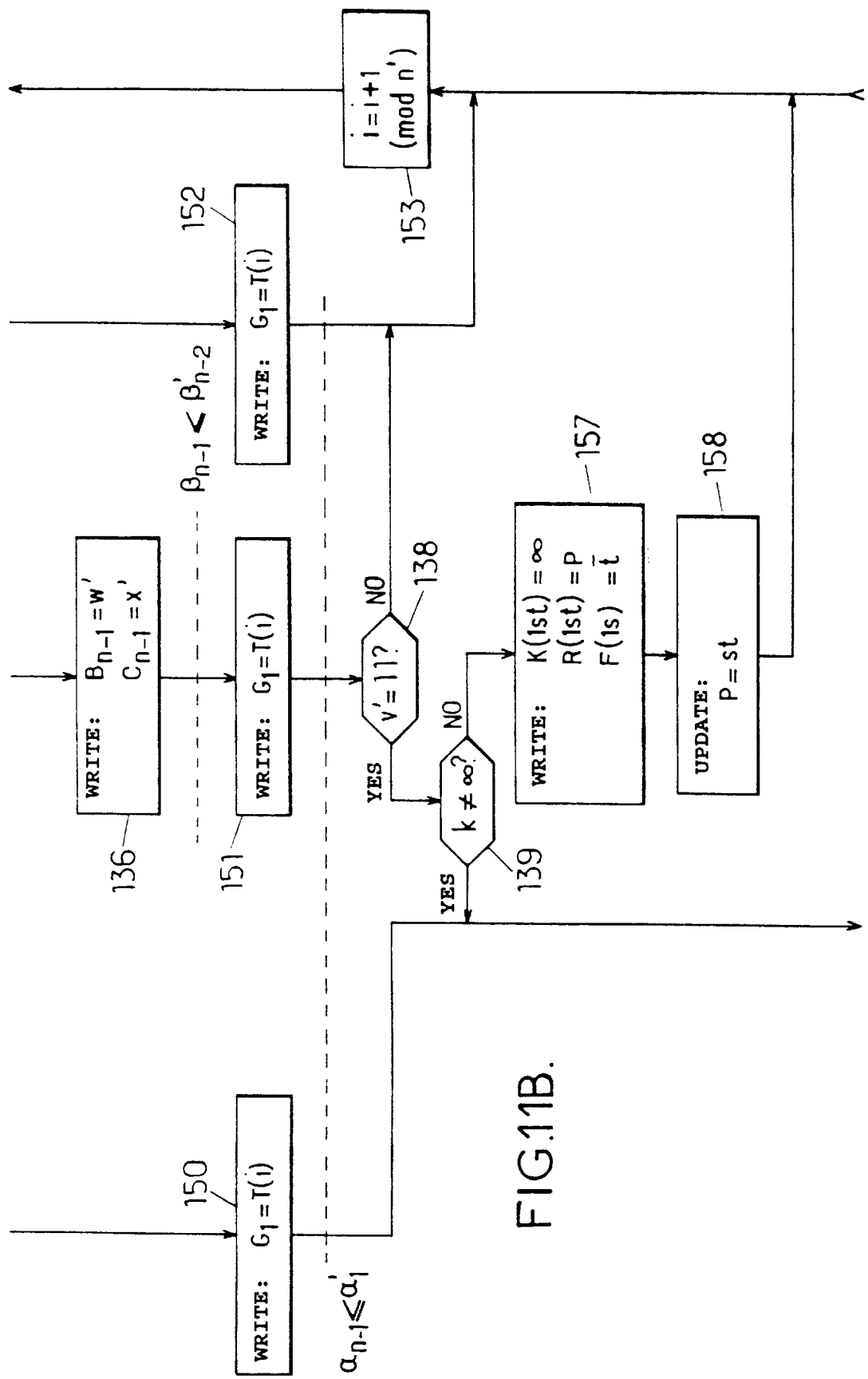

FIGS. 11A and 11B, which should be supplemented with FIG. 4C, show the operations performed by the last controller in relation to stage n−1 of the tree. Step 150, 151 or 152, executed between the instants $\beta_{n-1}$ and $\alpha_{n-1}$, corresponds to the writing, to the leaf designation field of register $26_1$, of the n−1 lowest order bits $G_1$=T(i) of the number of the leaf of rank i ($0 \leq i < n'$) in the list of free leaves corresponding to the contents of the shift register 30 illustrated in FIG. 8. The processing of each of the commands in relation to the last stage n−1 terminates in all cases by an incrementation, modulo n', of counter i in step 153, this corresponding to a shift operation in the register 30.

The controller $21_{n-1}$ also keeps a second list of free leaves, which it manages for example in last-in first-out (LIFO) mode. The first leaf of this second list is designated by a pointer P with n−1 bits stored in a register of the last controller or in its memory area $20_{n-1}$. The binary representation of the number of this first leaf is 1P. Each leaf of the second list contains a data element whose sort key is infinite, and the portion of memory corresponding to the associated reference is for example used to store a continuation pointer equal to the designation on n−1 bits of the next leaf in the second list (the portion corresponding to the key could also be used if one bit is reserved to identify the infinite keys).

When an insertion command reaches the controller of the last stage in the interface register $26_{n-1}$ ($A_{n-1}$=01), the free leaf designated by $G_{n-1}$ must be filled so as to contain the new data element. Consequently, steps 110 to 117 of the flowchart of FIGS. 10A and 10B are unnecessary. The reading step 105 is followed by a step 155 in which the controller $21_{n-1}$ reads from the variable h the continuation pointer R(1P) contained in the memory portion corresponding to the reference of the element contained in the first free leaf of the second list (step 155). In the next step 156, the controller $26_{n-1}$ updates the two lists of free leaves. It removes the free leaf designated by $G_{n-1}$ from the first list and replaces it, in the area T(i), by the pointer P of the first leaf of the second list; it then replaces this value P by that of the pointer read in step 155. The processor $21_{n-1}$ finishes processing the insertion command by going to the aforementioned step 150 and then to steps 119 to 126 of FIG. 4C and to step 153.

To process an exchange command ($A_{n-1}$=11), the controller of the last stage firstly executes steps 130 to 136 discussed previously. Step 137 is not necessary and is replaced by the aforementioned step 151. If the sort key $k=B_{n-1}$ proposed in exchange from stage n−2 is larger than that K(1st) read from the processed leaf (v'=11 during comparison 138), this key k is compared with infinity in step 139. If this key k is finite, the processing of the exchange command terminates via steps 119 to 126 of FIG. 4C and via step 153. Otherwise, the command refers to a straightforward extraction and frees a previously occupied leaf. In step 157, this leaf is updated by writing thereto an infinite sort key and, by way of reference, the value P of the pointer of the first leaf of the second list. The associated steering bit F(1s) receives the value complementary to that read in step 131. Before passing to the final step 153, the controller $26_{n-1}$ finishes processing the extraction command in step 158 by updating the pointer P of the first leaf of the second list with the binary designation st of the freed leaf.

On initialization of the device according to FIGS. 7 to 11, the two lists of free leaves are for example initialized as follows: T(i)=i, to the base 2, for $0 \leq i < n'$; P=n', to the base 2; and R(1i)=i+1, to the base 2, for $n' \leq i < 2^{n-1}$.

In the exemplary implementation illustrated by FIGS. 8, 11A and 11B, the last controller $21_{n-1}$ keeps the "first list" and the "second list" by means of a shift register 30 and an LIFO stack. It will be noted that other logic organizations of comparable complexity could be adopted. For example, the controller $21_{n-1}$ could keep a logic queue managed in first-in first-out (FIFO) mode, containing the numbers of the free leaves, while being assured that this FIFO queue always contains at least n' free leaf numbers. Under these conditions, the "first list" consists of the last n' locations of the queue, and the "second list" of the preceding locations of the queue.

In the sorting devices described above, the order relation according to which the keys are sorted, that is to say compared with one another in steps 111, 122, 123 and 133, corresponds to the ascending order of the natural integers. It will be understood that any order relation for which comparisons are easily made by means of simple logic circuits could be used to sort the elements in such a device.

If, for example, each sort key K(i) is a time tag defining a future instant at which it will be required to fetch the corresponding reference R(i) for the data element, the sorting device can serve as time-out device for controlling the temporal ordering of procedure. The key of the element located at the root of the tree is then compared with the current instant so as to exchange or extract this element if the current instant is attained.

If, in this application, the values of time are coded on L bits by a cyclic counter varying from 0 to $2^L-1$, the order relation between two L-bit keys k and k' can be: $k \leq k'$ if and only if $0 \leq (k'-k) \pmod{2^L} < 2^{L-1}$. Stated otherwise, it is sufficient, in step 122 for example, to calculate the difference k'-k on L bits (that is to say ignoring the highest order carry), and to examine whether the bit of order $2^{L-1}$ of this difference is 0 ($k \leq k'$) or 1 (k>k'). The chronological order of the keys is then complied with provided that no key designates an instant more than $2^{L-1}$ earlier or more than $2^{L-1}-1$ later than the current instant, an easy condition to fulfil by choosing a sufficiently large number L.

An application of the sorting devices described above will now be described in an ATM cell spacer.

ATM cells are 53-byte information packets transmitted over high-speed physical links (bit rate of 155 or 622 Mbit/s). Each physical link supports a multiplex of cells belonging to various virtual connections. The virtual connection to which each cell pertains is identified by a pair of identifiers VPI-VCI contained in the header of the cell. Certain facilities differentiate between virtual connections according to the virtual path identifier (VPI), while other facilities differentiate between the virtual connections on the basis of the virtual channel identifiers (VCI), or of both identifiers VPI, VCI.

In the present description, each ATM cell will be regarded as pertaining to a virtual connection identified by an identity IdCx internal to the facility provided with the spacer. This internal identity can correspond to the VPI, to the VCI, to the pair VPI-VCI, or else, more conveniently, to a specific identity individual to the facility and comprising a smaller number of bits than the VPI-VCI, so as to facilitate accesses to memory modules of reasonable size. An appropriate way of associating such identities IdCx with the ATM cells is described in French Patent Application No. 97 01222.

The ATM spacer is a unit whose main function is to regularize the bit rate of cells over the various connections supported by a physical link. In general, each source emitting on a virtual connection negotiates a peak bit rate with the operator. If this peak bit rate is not complied with by the source, there is a risk of congestions occurring in the network, and the operator is empowered to destroy cells on the connection.

In a spacer, a spacing interval T is allotted to each connection IdCx, in such a way that two consecutive cells relating to the same virtual connection are generally separated by at least the time interval T which typically corresponds to the inverse of the peak bit rate. We then speak of a real spacer. The real spacer calculates a theoretical emission time TET for each cell and then stores the cell in memory so as to emit it only at the desired time. The spacing interval T is then complied with for all the connections. In a so-called virtual spacer, a theoretical emission time TET is firstly calculated for each cell according to the same methods as before, and then the cell is stored in memory. The difference with the real spacer is that the virtual spacer emits the cells immediately in the order of the theoretical emission times. The virtual spacer does not degrade the cell delay variation (CDV). However, it does not allay the possible degradation of the bit rate by queues located upstream of the spacer.

The spacing function is frequently associated with the policing function which consists in eliminating cells transmitted in accordance with a virtual connection at a bit rate greater than the peak bit rate, when this excess bit rate is such that it is no longer possible to produce an output multiplex in which the cells pertaining to the connection are correctly spaced without the CDV exceeding a limit value depending on the quality of service negotiated with the operator. The policing function usually enters into the way of calculating the theoretical emission times TET of the cells.

A conventional way of allotting theoretical emission times to the cells and of performing the policing function is to apply the GCRA algorithm ("Generic Cell Rate Algorithm") defined in Annex 1 of ITU-T Recommendation I.371 (see M. DE PRYCKER: "Asynchronous Transfer Mode, Solution for Broadband ISDN", 2nd Edition, 1993, Chapter 7, paragraph 7.3.4, pages 292–293). For each virtual connection, this algorithm always satisfies the following relation: $ta \leq TET \leq ta+\tau$, where ta denotes the time of arrival of the cell, at which its theoretical emission time TET is calculated, and $\tau$ denotes the CDV tolerance of the connection.

Figure 12:
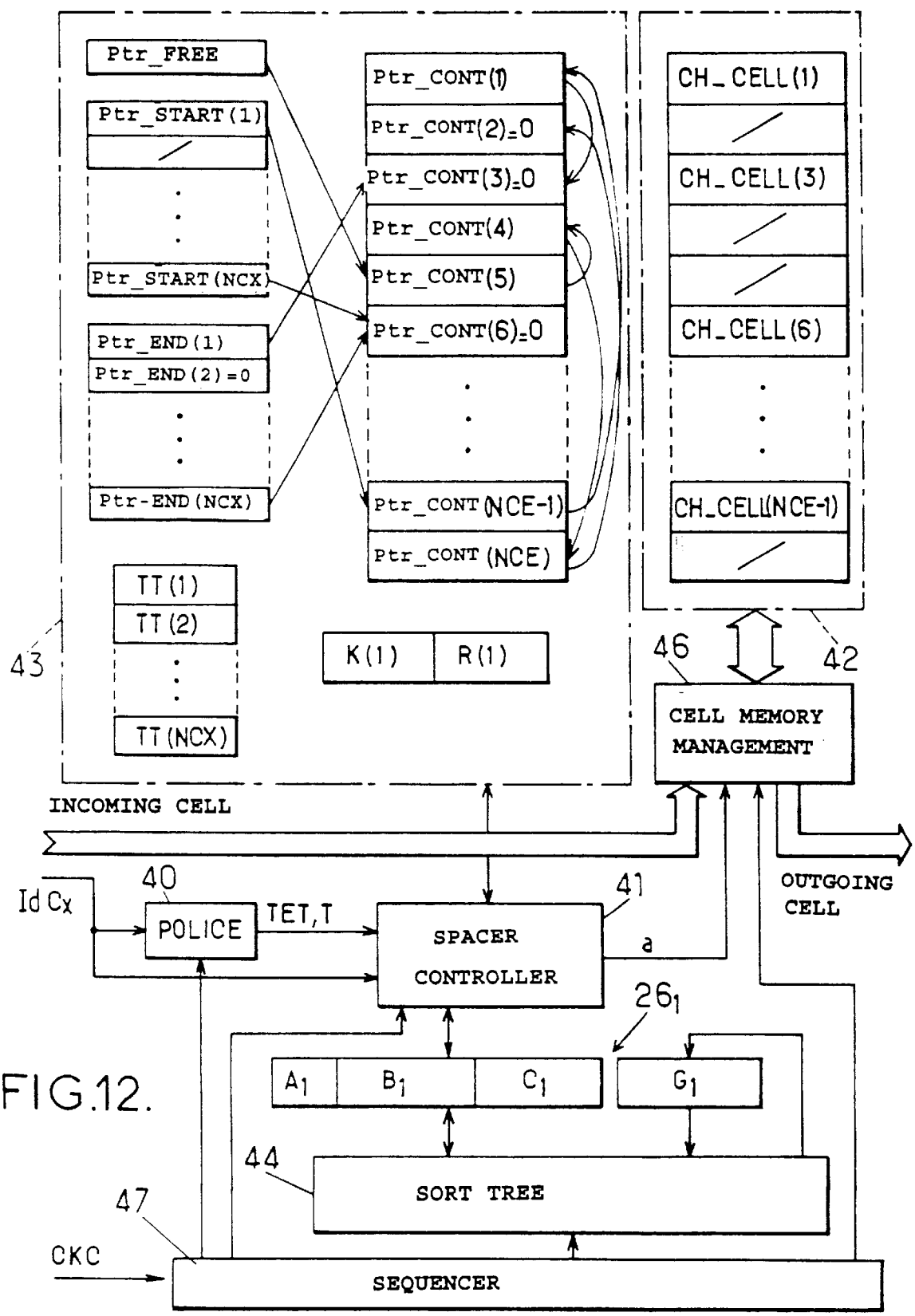
FIG. 12 is an overall diagram of an ATM cell spacer implementing the present invention.

In the spacer of FIG. 12, the policing function is carried out by a module 40 on the basis of the current time and of the identity IdCx of the connection to which each incoming cell pertains. The theoretical emission time TET calculated recursively for each cell is delivered by this module 40 to the spacing controller 41 together with the spacing interval T associated with the connection to which this cell pertains. On the basis of this information and the connection identities IdCx, the spacing controller 41 supervises the management of the cell memory 42 to which the incoming cells are written and from which the outgoing cells are read, and also manages a pointer memory 43 and the sorting device 44.

NCX denotes the number of virtual connections, numbered from IdCx=1 to IdCx=NCX, which the spacer is capable of processing, and NCE denotes the number of cells which the memory 42 is capable of containing, in predefined locations Ch_cell(1) to Ch_cell(NCE).

In the exemplary embodiment represented, the cell memory 42 and the pointer memory 43 consist of two distinct memory modules, the first of which is managed by a unit 46 under the control of the controller 41. However, it will be understood that other embodiments are possible. In particular, the memories 42 and 43 could be implemented within a single memory module in which accesses would be commanded by the controller 41. Thus, a two-megabyte RAM memory module makes it possible for example to store up to NCE=32,000 cells pertaining to NCX=4096 different virtual connections together with the pointers necessary for managing the cell memory.

Figure 13:
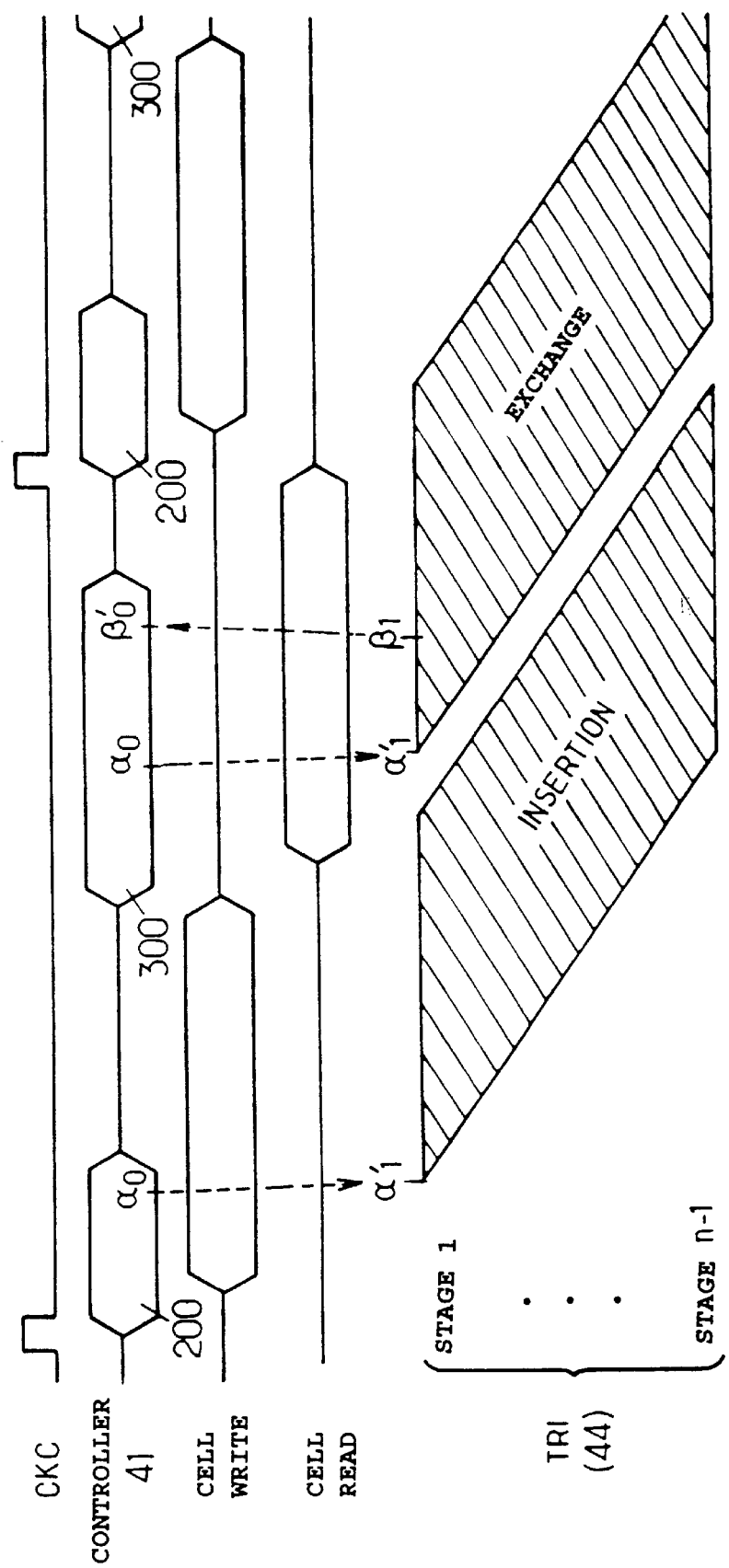
FIG. 13 shows timing diagrams of the operation of the spacer of FIG. 12.

FIG. 13 shows a cell-clock signal CKC on the basis of which a sequencer 47 of the spacer supplies the necessary clocking signals to the module 40, to the spacing controller 41, to the sorting device 44 and to the manager 46 of the cell memory (FIG. 12). The period of this clock signal is 2.7 μs in the case of a 155-Mbit/s link. At each period of this signal CKC, the spacer must be capable of receiving a cell written to the memory 42 (third line of FIG. 13), and of emitting a cell read from the memory 42 (fourth line of FIG. 13). In the exemplary clocking represented in FIG. 13, each cell period is divided into two successive phases of like duration, the first for receiving any incoming cell and the second for emitting any outgoing cell.

In the first phase of each cell period, the spacing controller 41 supplies the manager 46 with a start address a in the cell memory 42, starting from which this manager commands the writing of the 53 bytes of the incoming cell. In the second phase, the start address a supplied by the controller 41 enables the manager 46 to command the reading of the 53 bytes stored starting from the address a in the memory 42 so as to deliver the outgoing cell. For the purposes of the present account, the address a will be regarded as corresponding to the number of that location Ch_cell(a) of the memory 42 ($1 \leq a \leq NCE$) to which the cell is written or from which it is read, and that, by convention, a=0 tells the manager 46 that it must not command access to the memory 42 in the relevant phase (no incoming cell, or no cell to be emitted, during the cell period).

The cell memory 42 is organized in such a way as to contain, for each virtual connection for which it contains cells, a list of locations at which these cells are arrayed in first-in first-out (FIFO) mode. These lists are managed by the controller 41 by means of the pointer memory 43.

The pointers of the memory 43 comprise a free location pointer Ptr_free, NCX start of list pointers Ptr_start(IdCx) for $1 \leq IdCx \leq NCX$, NCX end of list pointers Ptr_end(IdCx) for $1 \leq IdCx \leq NCX$, and NCE continuation pointers Ptr_cont(i) for $1 \leq i \leq NCE$, respectively associated with the locations Ch_cell(1) to Ch_cell(NCE). Each identity IdCx of a virtual connection for which the memory 42 does not contain any cell at a given instant has its end of list pointer Ptr_end(IdCx) at zero at this instant, indicating an empty list (this is the case for IdCx=2 in the example represented in FIG. 12). Otherwise, the number i of the location Ch_cell(i) wherein is stored the cell received least recently according to the connection IdCx is equal to the start of list pointer Ptr_start(IdCx), and the number of that wherein is stored the cell received most recently according to the connection IdCx is equal to the end of list pointer Ptr_end(IdCx). The FIFO list relating to a connection IdCx is chained by means of the continuation pointers: the continuation pointer Ptr_cont(i) associated with a location Ch_cell(i) which is not an end of list designates the location Ch_cell (Ptr_cont(i)) which follows thereon in its list. If the location Ch_cell(i) is an end of list, then we set Ptr_cont(i)=0. In the example of FIG. 12, the list relating to IdCx=1 is Ch_cell(NCE−1), Ch_cell(1) and Ch_cell(3), and that relating to IdCx=NCX reduces to the location Ch_cell(6). The locations of the memory 42 which are not occupied by cells to be emitted form an LIFO list of free locations, the first of which is designated by the pointer Ptr_free and the succeeding ones by the successive continuation pointers. In the example of FIG. 12, the list of free locations is, in output order, Ch_cell(5), Ch_cell(NCE) and Ch_cell(2).

The root of the sort tree of the spacer of FIG. 12 is accessible by the spacing controller 41, which carries out the processing operations of the controller $21_0$ associated with stage 0 (FIGS. 2 to 11). The data element K(1), R(1) located at the root of the tree can then be stored in the pointer memory 43 as represented, or else in a special register of the controller 41. The controller 41 exchanges the commands and parameters with stages 1 to n−1 of the sorting device 44 by way of the interface register $26_1$ which, in the example considered, is in accordance with that described with reference to FIG. 7.

Each data element supplied to the sorting device 44 consists, in respect of the sort key K(i), of the theoretical time of emission of a cell stored in a location of the memory 42 constituting a start of list, and in respect of the reference R(i), of the identity IdCx of the virtual connection to which this cell pertains. The key K(i) is therefore a time tag which can be defined, as explained earlier, by a cyclic counter of L bits. A counter of L=16 bits for example, plus one bit to distinguish the infinite keys, is suitable for the application to an ATM spacer. The references R(i) can be on 12 bits for NCX=4096 connections.

If the spacer is a real spacer, the controller 41 compares the key K(1) present at the root of the tree with the current instant ta, and supplies a=Ptr_start(R(1)) to the manager 46 if $K(1) \leq ta$ so that the cell with the smallest theoretical emission time out of those cells located in starts of lists is emitted. In the case of a virtual spacer, the controller 41 acts in the same way, but without comparison with the current instant: a cell is emitted at each period as soon as $K(1)<\infty$.

Upon the arrival of a cell pertaining to a connection IdCx whose list of locations is empty (Ptr_end(IdCx)=0), this cell is stored at the location Ch_cell(Ptr_free), the list of free locations is updated, and the controller 41 commands the insertion into the sort tree of a data element whose reference corresponds to this IdCx and whose sort key is the TET calculated by the module 40 for this cell.

The arrival of a cell pertaining to a connection IdCx whose list of locations is not empty does not modify the contents of the sort tree, and requires only storage at the location Ch_cell(Ptr_free), and an updating of the list of free locations and of the list associated with the connection IdCx.

The emission of a cell pertaining to a connection IdCx whose list of locations contains this one cell entails the straightforward extraction of the corresponding element of the sort tree, which amounts to an exchange with an element having infinite key.

The emission of a cell pertaining to a connection IdCx whose list of locations contains one or more cells after this one entails an exchange between the corresponding element of the tree and a new element whose reference corresponds to this IdCx and whose sort key is the theoretical emission time assigned to the cell stored in second position in the list, that is to say at the location Ch_cell(Ptr_cont(Ptr_start (IdCx))).

In this latter case, the theoretical emission time forming the key of the new element can be that supplied by the module 40 in respect of the cell stored in the new start of list. It is then useful to store the TET times supplied by the module 40 as and when the cells arrive. However, it is preferable for the controller 41 to recalculate a theoretical emission time for the cell when it supplies the new data element to the sorting device 44.

To this end, the memory 43 contains an array in which are stored the values TT(IdCx) of the spacing intervals T allotted to the various virtual connections IdCx, which values the controller 41 receives from the module 40 when cells arrive according to the connections concerned. When $K(1) \leq ta$, the real spacer emits the cell stored in Ch_cell (Ptr_start(R(1))), and commands the exchanging of the element K(1), R(1) located at the root of the sort tree with a new element K(1)+TT(R(1)), R(1). Stated otherwise, the theoretical time of emission of the cell stored in the new start of list is taken equal to that of the cell emitted plus the time interval TT(IdCx) allotted to the relevant connection.

This way of proceeding has two advantages. The first is that if the module 40 assigns, to two consecutive cells pertaining to a connection IdCx, theoretical emission times TET which are more than TT(IdCx) apart on account of their respective arrival times and if the second of these two cells is already written to the memory 42 when the first is emitted, then the theoretical time of emission of the second cell can be advanced relative to that calculated by the module 40 as can the theoretical times of emission of succeeding cells of the connection without impairing the required spacing properties. This avoids needlessly delaying some cells.

The second advantage is that the spacing intervals allotted to some connections can be modified dynamically and immediately. When the clogging of the link gives rise to the risk of congestion, the facility can for example increase the spacing interval for some virtual connections. This increase takes effect immediately, including in respect of the cells of this connection contained in the memory 42 which will therefore not be emitted in accordance with their initially calculated TETs. A delay in the application of preventive measures is thus avoided, which delay could lead to the congestion not being avoided. Of course, permission to increase the spacing interval for a connection must be agreed with the source when this connection is established, given that, for the same CDV tolerance and the same behaviour of the source, it increases the probability that cells will be destroyed by the policing function.

Figure 14:
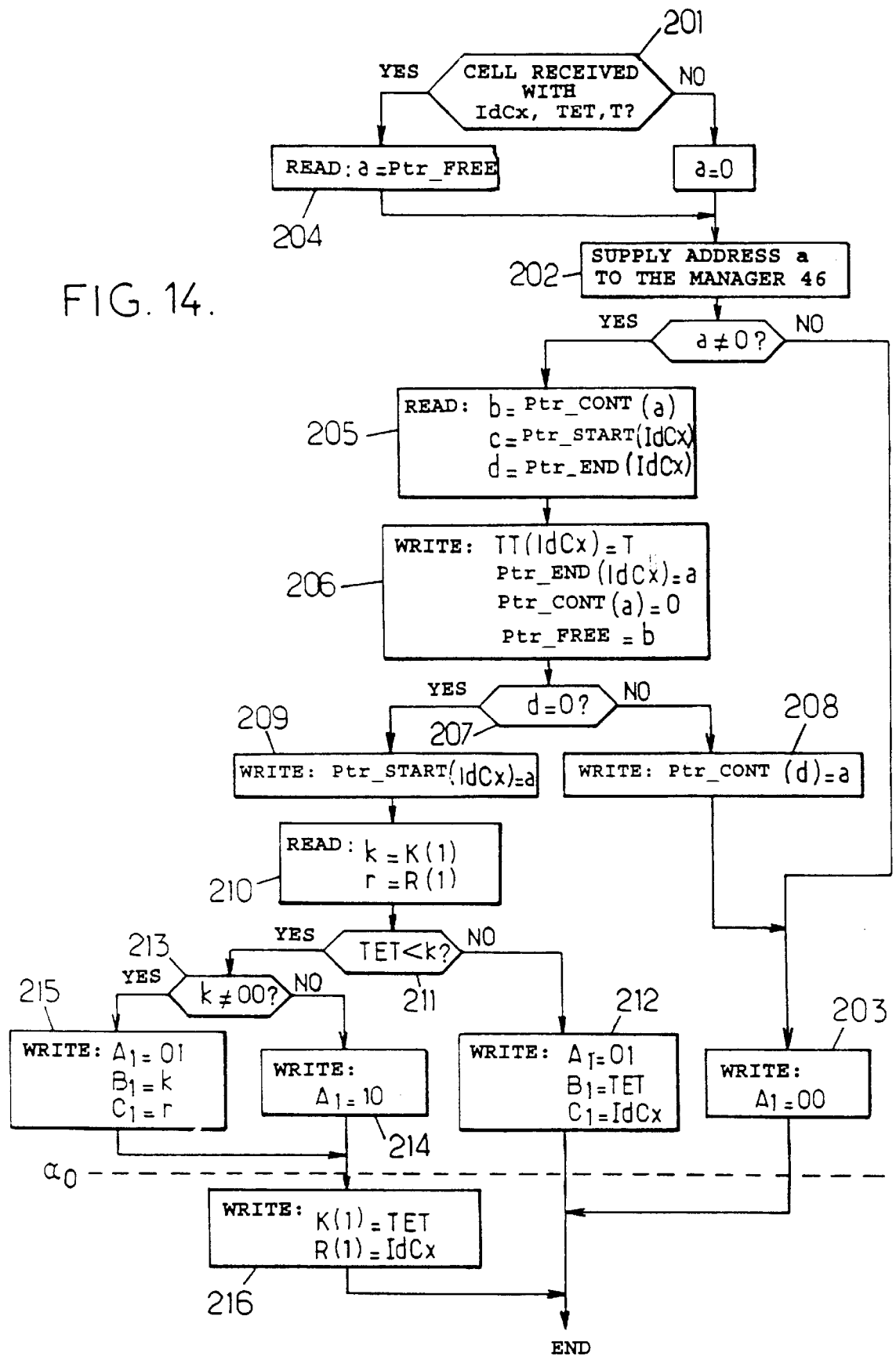
FIGS. 14 and 15 are flowcharts respectively showing the operations performed by the controller of the spacer of FIG. 12 on receiving and emitting an ATM cell.

FIG. 14 shows the operations performed by the controller 41 in the first phase of each cell period, during the time intervals 200 indicated in the second line of FIG. 13.

The first step 201 consists in determining whether an incoming cell reaches the spacer during the cell period in question, and if appropriate in ascertaining the identity IdCx of the connection to which this cell pertains together with the theoretical emission time TET and the spacing interval T supplied for this cell by the module 40.

If no incoming cell is received, the address a=0 is supplied to the manager 46 of the cell memory in step 202, and then the controller 41 writes a no modification of the contents of the binary tree command ($A_1$=00) to the interface register $26_1$ in step 203.

If an incoming cell is present, the free location pointer Ptr_free is read from the pointer memory 43 in step 204, and is assigned to the address a which is supplied to the manager 46 in step 202. If a=0 (no cell received or more free location in the memory 42), the manager 46 does not write to the memory 42 in the current cell period, and the spacing controller 41 executes the aforementioned step 203 so that the contents of the binary tree remain unchanged. Otherwise, the controller 41 goes to the pointer reading step 205.

In step 205, the number Ptr_cont(a) of the second location of the list of free locations, the number Ptr_start(IdCx) of the start of list relating to the connection IdCx and the pointer Ptr_end(IdCx) of this list are assigned to the variables b, c and d respectively. In step 206, the array TT of spacing intervals is updated for the connection IdCx according to the value T received from the module 40, the address a is written to the memory 43 as the pointer to the end of the list of locations which relates to the connection IdCx, the continuation pointer Ptr_cont(a) associated with this location is set to zero to indicate that henceforth we have an end of list, and the free location pointer Ptr_free is updated with the variable b.

If the list of locations relating to the connection IdCx was not empty (that is to say if d≠0 during comparison 207), no modification of the contents of the sort tree is necessary as explained earlier, so that the spacing controller 41 executes the aforementioned step 203 after having updated the continuation pointer associated with the preceding end of list with the old free location pointer in step 208: Ptr_cont(d)=a.

If the comparison 207 shows that d=0, the controller 41 completes the updating of the list pointers in step 209 by writing Ptr_start (IdCx)=a. It then proceeds to insert the new data element TET, IdCx into the sort tree. The operations which it performs therefor correspond to those performed by the controller $26_0$ of stage 0 of the binary tree, that is to say to steps 110 to 119 of the flowchart of FIGS. 10A, 10B and 4C. In step 210, the controller 41 assigns to the variables k and r the sort key K(1) and the reference R(1) of the data element read at the root of the tree, and then it compares the key k with the theoretical emission time TET received from the module 40 in step 201 (comparison 211). If TET≧k, the insertion command must be propagated to stage 1 of the sort tree, so that the controller 41 writes $A_1$=01, $B_1$=TET and $C_1$=IdCx to the pipeline register $26_1$ in step 212, the leaf designation field of the register $26_1$ receiving the number of a free leaf $G_1$ from the last controller $21_{n-1}$ of the sorting device 44, as indicated in FIG. 12.

If the comparison 211 shows that TET<k, then the new data element TET, IdCx needs to be written at the root of the tree, this being performed in step 216. Prior to this, the controller 41 propagates a reset command $A_1$=10 in the pipeline register $26_1$ in step 214 if the sort key k previously located at the root of the tree is infinite (comparison 213). Otherwise, the controller 41 writes to the register $26_1$ an insertion command ($A_1$=01) for the element $B_1$=k, $C_1$=r previously located at the root in step 215.

As far as the synchronization of the controller 41 with those of the sorting device 44 is concerned, FIG. 14 shows that the instant $α_0$ corresponding to that which was relevant with reference to FIGS. 5 and 9 occurs after the step 203, 212, 214 or 215 of writing by the controller 41 to the pipeline register $26_1$.

Commencing from this instant $α_0$, the controller $21_1$ of stage 1 can begin processing the command (instant $α'_1$ indicated in FIG. 13).

Figure 15:
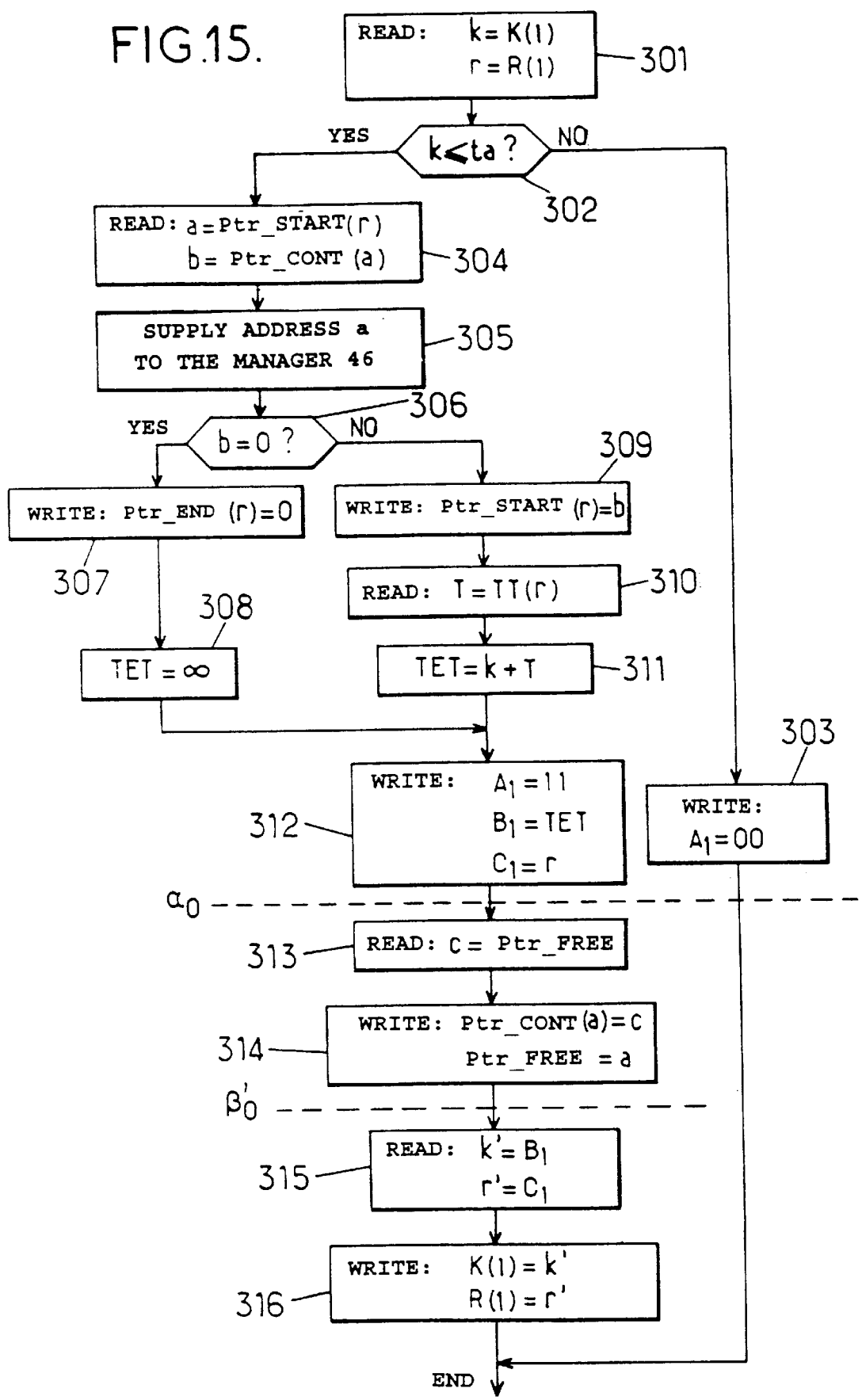

FIG. 15 shows the operations performed by the controller 41 in the second phase of each cell period, during the time intervals 300 indicated in the second line of FIG. 13.

The first step 301 consists in reading the sort key K(1) and the reference R(1) of the data element located at the root of the tree, and in assigning them to the variables k and r respectively. The next comparison 302 serves to decide whether a cell is or is not to be emitted. In the case of a real spacer, this step 302 consists in comparing the sort key k with the current time ta. In the case of a virtual spacer, it consists simply in examining whether the key k is finite or infinite. If k>ta (in the case of a real spacer), the controller 41 performs no operation in the second phase of the cell period, except for writing a no modification of the contents of the binary tree command $A_1$=00 to the pipeline register $26_1$ (step 303).

If from step 302 it ensues that a cell is to be emitted, the number of the location at the start of list in relation to the connection r, as well as the continuation pointer associated with this location are read from the memory 43 and assigned to the variables a and b respectively in step 304. The address a can then be supplied to the manager 46 in step 305 so that it emits the cell stored at this address (fourth line of FIG. 13). If the list of locations relating to the connection r=R(1) identified in the element located at the root of the tree contained only a single cell, then the variable b is at 0. This is detected by the comparison 306. In this case, the end of list pointer Ptr_end(r) is set to zero in step 307 to indicate that this list no longer contains any cell, and in step 308 an infinite value is assigned to the theoretical emission time TET which will constitute the sort key of the new element to be exchanged in the binary tree.

If b≠0 in step 306, the list of locations contains several cells, and the variable b is written in step 309 as the start pointer for this list, and, in step 311, the cell stored in the location Ch_cell(b) receives a new theoretical emission time TET equal to the key k=K(1) read in step 301, to which is added a variable T taken equal to the spacing interval TT(r) of the relevant connection, read in step 310. The command ($A_1$=11) for exchanging the element K(1), R(1) located at the root of the tree with the new element $B_1$=TET, $C_1$=r is written to the pipeline register $26_1$ in step 312.

The instant $\alpha_0$ commencing from which the controller $21_1$ of the sorting device 44 can begin to process the command is located after step 312 (or step 303), as FIG. 15 shows. The spacing controller 41 must wait for the instant $\beta'_0 \geq \beta_1$ (see FIG. 13) before fetching into the register $26_1$ the element returned from stage 1 of the sort tree. In the example illustrated by FIG. 15, the controller 41 updates the list of free locations in the interval [$\alpha_0, \beta'_0$]: in step 313 it reads the free location pointer Ptr_free and assigns it to the variable c; next, in step 314, it writes Ptr_cont(a)=c and Ptr_free=a to the memory 43.

Once the controller of stage 1 of the tree has returned the element having the smallest key to the register $26_1$, this element is read by the controller 41 in step 315, and then written to the root of the tree in step 316.

Figure 16:
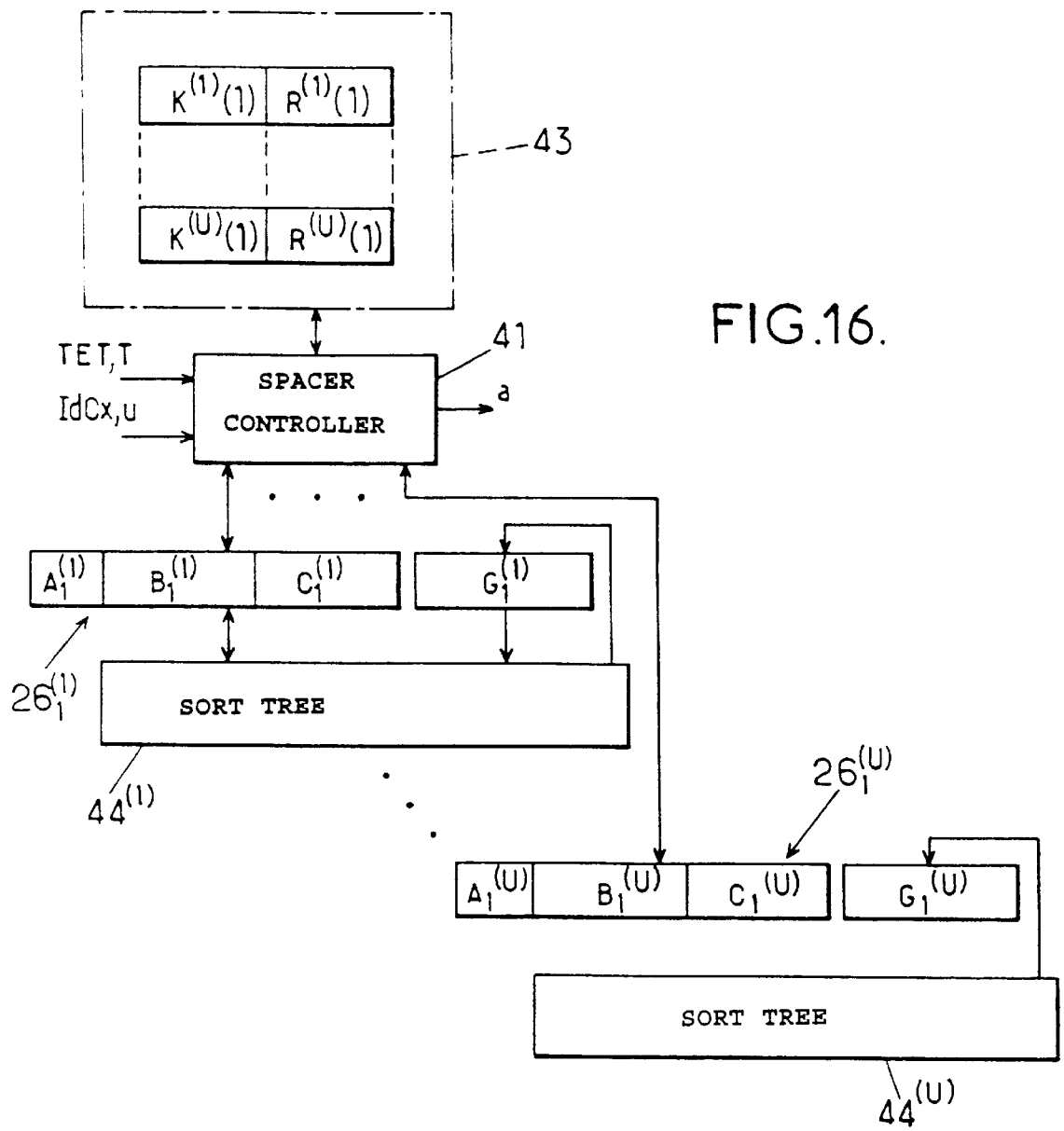

FIG. 16 shows a variant of an ATM cell spacer capable of taking into account priority indices assigned to the virtual connections. This priority index, which is assumed to take its values between 1 and U, is denoted u. The spacer of FIG. 16 comprises U sorting devices $44^{(u)}$ each having a pipeline register $26_1^{(u)}$ between its stage 0 and its stage 1. The operation of each sorting device $44^{(u)}$ is the same as that described earlier. The root of each binary tree is assumed to be contained in the pointer memory 43 (the remainder of which is not represented in FIG. 16) and to be managed by the spacing controller 41. The operation of the cell memory 42 and of its manager 46 is the same as previously in respect of the writing and reading of cells at the addresses a supplied by the controller 41.

Each of the sorting devices $44^{(u)}$ processes data elements whose references $R^{(u)}(i)$ designate identities of virtual connections IdCx having the same priority index u. Among these elements, the device $44^{(u)}$ selects at its root (in the memory 43 in the example represented) an element whose key $K^{(u)}(1)$ is minimal. The spacing controller is then devised so as to command the emission of the cell contained in the start of list relating to the connection identified in that of the data elements located in the roots of the trees which exhibits the smallest sort key. In the event of equality between several minimum sort keys $K^{(u)}(1)$, the spacing controller 41 picks the connection which has the largest priority index amongst the ex aequos.

This management of the priority indices does not significantly complicate the spacing controller 41. As far as the operations performed on receiving a cell are concerned, the flowchart of FIG. 14 is unchanged, steps 210 to 216 being performed in regard to the sort tree $44^{(u)}$ which corresponds to the priority index u received by the controller 41 at the same time as the connection identity IdCx.

As far as the operations performed in the second phase of each cell period are concerned (FIG. 15), the steps 301, 302 for reading the element located at the root of the tree and for comparing the key of this element with the current time are performed in succession in descending order of priority indices until, for an index u, step 302 shows that the current time has been reached. In this case, steps 304 to 316 are executed without change, writing 312 and reading 315 being performed to/from the register $26_1^{(u)}$, and writing 316 to the root of the sort tree concerned.

In the example of FIG. 16, the U sorting devices are distinct. It is noted that these various sorting devices could share their control means, namely their controllers $21_q$ and their pipeline registers $26_q$. FIG. 17 illustrates such an implementation in the particular case where U=2.

In the embodiment of FIG. 17, the U=2 sort trees share the interface registers $26_q$ and the stage controllers $21_q$. Only their storage stages $20_q^{(1)}$, $20_q^{(2)}$ (q≥0) are differentiated. The two stages 0 are contained within the pointer memory 43. For each stage q≥1, the corresponding stages $20_q^{(1)}$, $20_q^{(2)}$ of the two trees are formed by two distinct areas of the memory managed by the controller $21_q$, which are differentiated on the basis of an additional address bit consisting for example of the binary priority index then forming the highest order bit of the field $D_q$ of the pipeline registers.

What is claimed is:

1. Device for sorting data elements each including a respective sort key, comprising:

storage means organized according to a binary tree with $2^n-1$ nodes numbered from 1 to $2^n-1$ which are each able to contain a data element and are distributed in n successive stages numbered from 0 to n−1, whereby stage q comprises nodes $2^q$ to $2^{q+1}-1$; and means of control of the binary tree for dispersing data elements to be sorted within the tree in such a way as to satisfy an ordering condition according to which, for each integer i lying between 1 and $2^{n-1}-1$ such that node i contains an element to be sorted, each of the nodes 2i and 2i+1 either contains no element to be sorted, or contains an element having a sort key greater than or equal to, in the sense of a determined order relation, the sort key of the element contained in node i, wherein the means of control respond to commands to modify the contents of the binary tree which include commands for inserting a new element to be sorted, wherein the means of control comprise m successive controllers each associated with a stage or with a plurality of consecutive stages of the binary tree, m being an integer lying between 2 and n, and n−1 interface registers between successive stages, among which each of the m−1 interface registers between stage pairs associated with different controllers constitutes a pipeline register, and wherein each command for modifying the contents of the binary tree is propagated from stage 0 to stage n−1 by means of the interface registers, the pipeline register or registers allowing parallel working of the controllers.

2. Device according to claim 1, wherein, for each integer q lying between 1 and n−1, the interface register between stage q−1 and stage q comprises a first location for receiving a command propagated from a node of stage q−1 to a node of stage q, a second location for receiving an identification of said node of stage q−1 which the associated controller accesses during the processing of said command, and a third location for receiving a data element transmitted from or to said node of stage q−1.

3. Device according to claim 2, wherein, for each integer q lying between 1 and n−1, the interface register between stage q−1 and stage q comprises a fourth location for receiving a bit designating, with the identification contained in the second location, the node of stage q to which said command is propagated and to which the associated controller accesses during the processing of the command contained in the first location if said command relates to the insertion of a new element into the tree.

4. Device according to claim 3, wherein, for each integer q lying between 1 and n−1, the second and fourth locations of the interface register between stage q−1 and stage q form part of a leaf designation field of n−1 bits containing, during the propagation of a command for inserting a new element, the n−1 lowest order bits of the number of a free leaf, that is to say of a free node of stage n−1, towards which said command is propagated, the node of stage q to which said command is propagated being designated by the q highest order bits of the contents of the leaf designation field.

5. Device according to claim 4, wherein the controller associated with stage n−1 of the tree manages a first list of free leaves containing a specified number n' of free leaves including each leaf towards which a command for inserting a new element is currently being propagated within the tree, and a second list of free leaves containing the free leaves not contained in the first list, wherein, during the registering of a command for inserting a new element to be sorted into the first location of the interface register between stages 0 and 1, the n−1 lowest order bits of the number of a free leaf of the first list, different from each leaf towards which another insertion command is currently being propagated within the tree, are registered into the leaf designation field of the interface register between stages 0 and 1, wherein, during an extraction of an element from a leaf of the tree, said leaf is included in the second list of free leaves, and wherein, when a command for inserting a new element reaches stage n−1 in the interface register between stages n−2 and n−1, the associated controller removes from the first list of free leaves the leaf designated by the n−1 bits of the leaf designation field of said interface register, and replaces it by a leaf from the second list.

6. Device according to claim 5, wherein n'<n.

7. Device according to claim 5, wherein the first list of free leaves is stored in a shift register looped back on itself, having n' locations each receiving the n−1 lowest order bits of a leaf number.

8. Device according to claim 5, wherein the second list of free leaves is stored in last-in first-out mode in the form of a chain of pointers, each pointer representing the number of a leaf, the first pointer of the chain being stored at a specific location, and the i-th pointer of the chain (i≧2) being stored in the leaf whose number is represented by the (i−1)-th pointer of the chain.

9. Device according to claim 5, wherein the first and second lists are stored in the form of a logic queue of first-in first-out type having at least n' locations, the first list consisting of the last n' locations of the logic queue and the second list of the preceding locations of the logic queue.

10. Device according to claim 2, wherein, p being the number, greater than or equal to 1 and less than n−1, of stages of the binary tree which are associated with the m-th controller, the storage means comprise at least $2^{n-p-1}-1$ locations for containing differential counters respectively associated with the pairs of nodes $2i$ and $2i+1$ of the tree for i ranging from 1 to $2^{n-p-1}-1$, each differential counter associated with a pair of nodes having a value indicative of a difference between the numbers of data elements respectively contained in descendants of the two nodes of said pair, the descendants of a node i of a stage q being defined as the $2^{n-q}-1$ nodes of the binary tree whose numbers are of the form $i2^j+j'$ where j and j' are integers such that $0\leq j<n-q$ and $0\leq j'<2^j$, and wherein, when the interface register between stage q−1 and stage q ($1\leq q<n-p$) receives a command for inserting a new element into the first location thereof and the identification of a node i of stage q−1 into the second location thereof, said insertion command is propagated to node $2i$ or $2i+1$ of stage q depending on the value of the differential counter associated with the pair of nodes $2i$ and $2i+1$.

11. Device according to claim 10, wherein the locations of the storage means containing the differential counters associated with the pairs of nodes of a stage are accessible by the same controller as the nodes of said stage.

12. Device according to claim 2, wherein the storage means comprise $2^{n-1}-1$ locations for containing steering bits respectively associated with the pairs of nodes $2i$ and $2i+1$ of the tree for i ranging from 1 to $2^{n-1}-1$, each steering bit associated with a pair of nodes pointing to one of the nodes of said pair containing an element whose sort key is less than or equal to the sort key of the element contained in the other node of said pair, and wherein, when the interface register between stage q−1 and stage q ($1\leq q\leq n-1$) receives a command for extracting or exchanging an element in the first location thereof and the identification of a node i of stage q−1 in the second location thereof, said extraction or exchange command is propagated to node $2i$ or $2i+1$ of stage q depending on the value of the steering bit associated with the pair of nodes $2i$ and $2i+1$.

13. Device according to claim 12, wherein the locations of the storage means containing the steering bits associated with the pairs of nodes of a stage are accessible by the same controller as the nodes of said stage.

14. Spacer of ATM cells transmitted according to a set of virtual connections, comprising: a cell memory to which incoming cells are written and from which outgoing cells are read; means for allocating a theoretical emission time to each cell stored in the cell memory; spacing control means for managing the cell memory, with the aid of an associated pointer memory, in such a way that the cell memory comprises, for each virtual connection for which it contains cells, a list of locations where said cells are stored in first-in first-out mode between a start of list and an end of list; and sorting means for ordering data elements each comprising a virtual connection identity and a sort key consisting of the theoretical time of emission of the cell contained in the start of list relating to said virtual connection, and for selecting at least one data element having a minimum sort key, wherein the spacing control means are devised so as to command the emission of a cell contained in the start of list relating to a virtual connection identified in a data element selected by the sorting means, wherein the sorting means comprise at least one sorting device comprising: storage means organized according to a binary tree with $2^n-1$ nodes numbered from 1 to $2^n-1$ which are each able to contain a data element and are distributed in n successive stages numbered from 0 to n−1, whereby stage q comprises nodes $2^q$ to $2^{q+1}-1$; and means of control of the binary tree for dispersing data elements to be sorted within the tree in such a way as to satisfy an ordering condition according to which, for each integer i lying between 1 and $2^{n-1}-1$ such that node i contains an element to be sorted, each of the nodes $2i$ and $2i+1$ either contains no element to be sorted, or contains an element having a sort key greater than or equal to, in the sense of a determined order relation, the sort key of the element contained in node i, wherein the means of control of said sorting device respond to commands to modify the contents of the binary tree which include commands for inserting a new element to be sorted, wherein the means of control of said sorting device comprise m successive controllers each associated with a stage or with a plurality of consecutive stages of the binary tree, m being an integer lying between 2 and n, and n−1 interface registers between successive stages, among which each of the m−1 interface registers between stage pairs associated with different controllers constitutes a pipeline register, and wherein each command for modifying the contents of the binary tree is propagated from stage 0 to stage n−1 by means of the interface registers, the pipeline register or registers allowing parallel working of the controllers, and wherein node 1 of stage 0 of said sorting device contains said selected element.

15. Spacer according to claim 14, wherein the means for allocating a theoretical emission time to each cell stored in the cell memory comprise means of recursive calculation of a theoretical emission time for each cell pertaining to a virtual connection on the basis of parameters including at least a time of arrival of said cell and a spacing interval allotted to said connection, wherein, upon the arrival of a cell pertaining to a virtual connection for which the cell memory contains no cell, the sorting means receive a new data element comprising the identity of said virtual connection and, as sort key, the theoretical time of emission of said cell supplied by the means of recursive calculation, and wherein, upon the emission of a first cell pertaining to a virtual connection for which the cell memory comprises a list of locations further containing at least one second cell, the sorting means receive a new data element comprising the identity of said virtual connection and, as sort key, a theoretical time of emission of said second cell equal to the theoretical time of emission of said first cell plus the spacing interval allotted to said connection.

16. Spacer according to claim 14, wherein priority indices are assigned to the virtual connections, wherein the sorting means comprise several sorting devices, each processing data elements comprising identities of virtual connections of like priority index and each selecting, from among the data elements which it processes, an element having a minimum sort key, and wherein the spacing control means are devised so as to command the emission of a cell contained in the start of list relating to the identified connection either in that one of the data elements selected which exhibits the smallest sort key or, if a plurality of sorting devices each select a data element whose sort key is the smallest, in that one of the data elements selected by said plurality of sorting devices for which the priority index is a maximum.

17. Spacer according to claim 16, wherein the various sorting devices each comprise respective storage means and share their control means.

* * * * *